(12) United States Patent
Nezu

(10) Patent No.: US 9,080,705 B2
(45) Date of Patent: Jul. 14, 2015

(54) CONNECTOR

(75) Inventor: Mikio Nezu, Fujisawa (JP)

(73) Assignee: NIFCO INC., Yokohama-Shi, Kanagawa (JP)

( * ) Notice: Subject to any disclaimer, the term of this patent is extended or adjusted under 35 U.S.C. 154(b) by 0 days.

(21) Appl. No.: 13/704,105

(22) PCT Filed: Jun. 9, 2011

(86) PCT No.: PCT/JP2011/063281
§ 371 (c)(1),
(2), (4) Date: Jan. 7, 2013

(87) PCT Pub. No.: WO2011/158734
PCT Pub. Date: Dec. 22, 2011

(65) Prior Publication Data
US 2013/0134701 A1    May 30, 2013

(30) Foreign Application Priority Data

Jun. 15, 2010    (JP) ................................ 2010-136430

(51) Int. Cl.
*F16L 37/00*    (2006.01)
*F16L 37/12*    (2006.01)
*F16L 37/096*    (2006.01)

(52) U.S. Cl.
CPC ............... *F16L 37/12* (2013.01); *F16L 37/096* (2013.01)

(58) Field of Classification Search
USPC ................................ 285/308, 87, 88, 320, 81
See application file for complete search history.

(56) References Cited

U.S. PATENT DOCUMENTS

| | | | | |
|---|---|---|---|---|
| 2,419,916 | A * | 4/1947 | Raffield | 285/88 |
| 3,697,928 | A * | 10/1972 | Hammell | 439/157 |
| 4,624,483 | A * | 11/1986 | Stromberg | 285/24 |
| 4,875,715 | A * | 10/1989 | Dennany et al. | 285/87 |
| 5,251,940 | A * | 10/1993 | DeMoss et al. | 285/87 |
| 5,797,626 | A * | 8/1998 | Ruggero | 285/5 |
| 6,626,465 | B2 * | 9/2003 | Lacroix et al. | 285/80 |
| 6,834,888 | B2 * | 12/2004 | Campau | 285/81 |

(Continued)

FOREIGN PATENT DOCUMENTS

| | | |
|---|---|---|
| JP | S49-30923 U | 3/1974 |
| JP | 49-16968 Y1 | 5/1974 |

(Continued)

OTHER PUBLICATIONS

PCT, "International Search Report for PCT/JP2011/063281", Sep. 13, 2011.

*Primary Examiner* — Aaron Dunwoody
(74) *Attorney, Agent, or Firm* — Manabu Kanesaka

(57) ABSTRACT

When releasing a connection between a second tube member and a first tube member, a ring member is moved, whereby an inclined surface of a bump part and an inclined surface of a bump part of a cam part slide, and a stopper rotates from a coupled position to an uncoupled position. Thus, a coupling between a leading end part of a claw part of the stopper on the second tube member, and a coupling surface of a coupling-accepting part on the first tube member is released. In connecting the first and second tube members, when the first tube member is pushed into the second tube member with the ring member in the locked position, the claw part of the stopper is elastically deformed, whereby the leading end part of the claw part rides past the coupling-accepting part, and couples to the coupling surface of the coupling-accepting part.

10 Claims, 21 Drawing Sheets

(56) References Cited

U.S. PATENT DOCUMENTS

| | | | |
|---|---|---|---|
| 6,926,311 B2 * | 8/2005 | Chang et al. | 285/317 |
| 7,073,773 B2 | 7/2006 | Nuttall et al. | |
| 7,469,937 B2 | 12/2008 | Iturgoyen Sabando et al. | |
| 7,722,086 B2 * | 5/2010 | Ishiki et al. | 285/81 |
| 8,220,837 B2 * | 7/2012 | Kaneda | 285/87 |
| 8,297,658 B2 * | 10/2012 | Le Quere | 285/35 |
| 8,662,543 B2 * | 3/2014 | Lechner et al. | 285/308 |
| 2004/0150223 A1 * | 8/2004 | Campau | 285/308 |
| 2010/0052313 A1 * | 3/2010 | Ishida et al. | 285/93 |
| 2013/0125377 A1 * | 5/2013 | Nick et al. | 29/525.11 |

FOREIGN PATENT DOCUMENTS

| | | |
|---|---|---|
| JP | 56-108089 U | 8/1981 |
| JP | 63-77195 U | 5/1988 |
| JP | H08-128580 A | 5/1996 |
| JP | 2000-329270 A | 11/2000 |
| JP | 2004-530843 A | 10/2004 |
| JP | 2007-527976 A | 10/2007 |

* cited by examiner

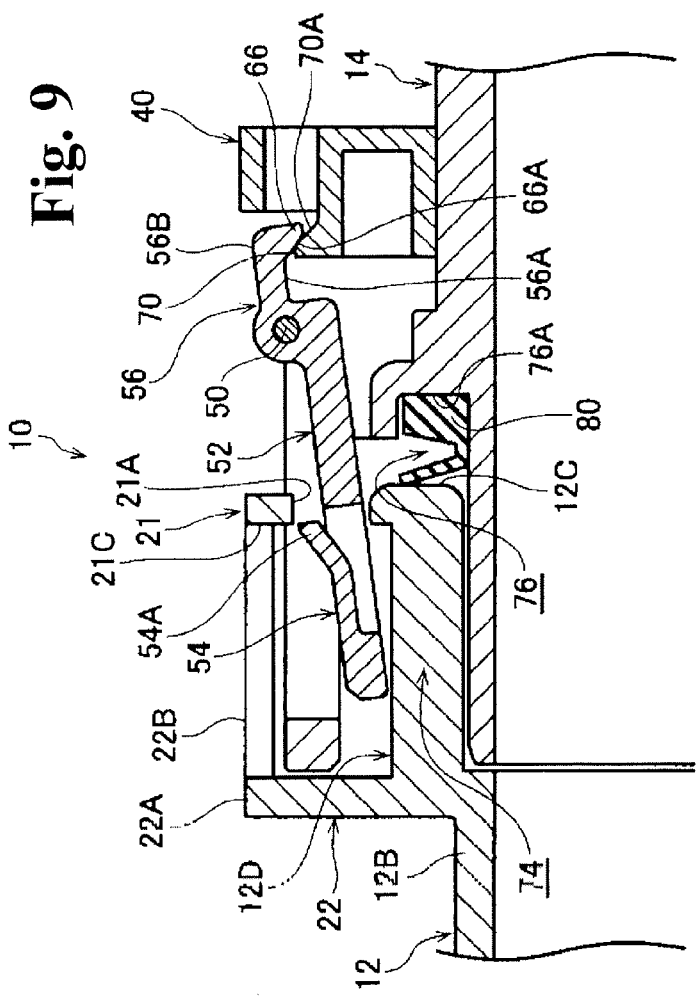
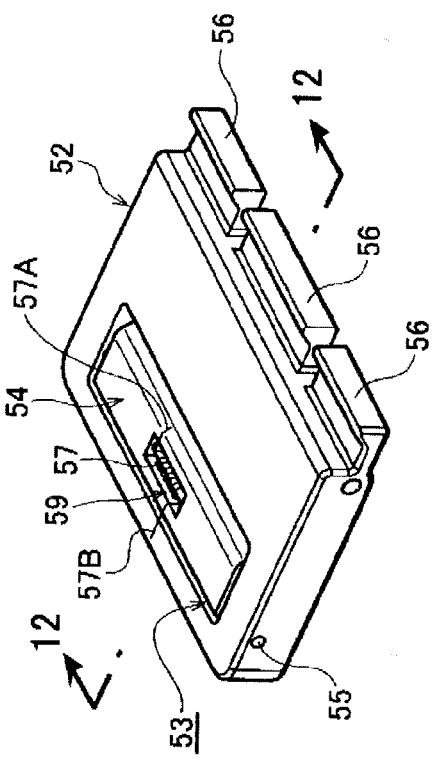

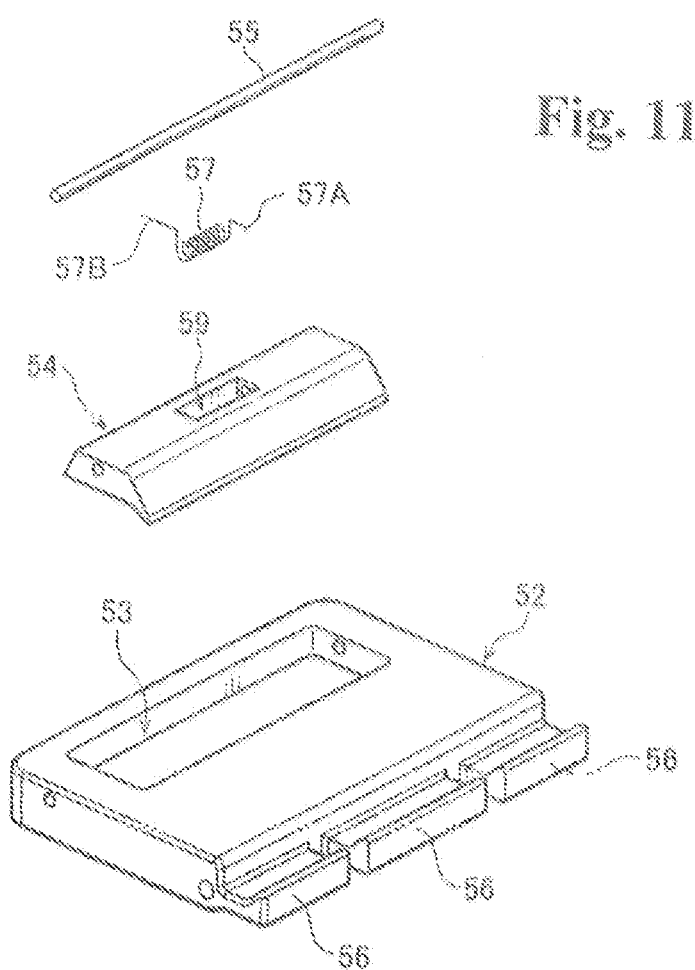

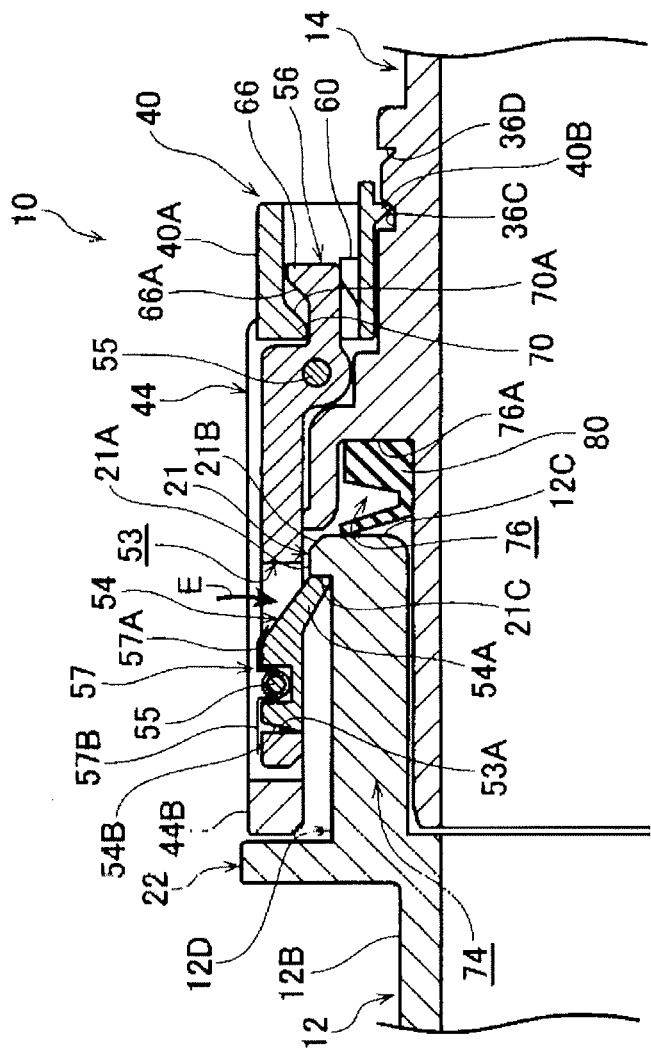

CONNECTOR

RELATED APPLICATIONS

The present application is National Phase of International Application No. PCT/JP2011/063281 filed Jun. 9, 2011, and claims priority from Japanese Application No. 2010-136430, filed Jun. 15, 2010.

TECHNOLOGICAL FIELD

The present invention relates to a connector for connecting ducts, and the like.

BACKGROUND TECHNOLOGY

As connectors to be used for parts of connection of automotive ducts, and the like, there are conventionally known connectors with which female members and male members can be connected instantly. For example, in Patent Document 1, a connector comprises a male member having a single perimeter edge groove on an outer perimeter, and a female member having two outer projections delineated respectively by inner recessed parts formed so as to receive a sealing gasket and a fixing gasket. Also, in the case when the female member and the male member are connected, the female member extends to the male member without covering the perimeter groove of the male member, and a fixing clip is insertion-coupled in the groove of the male member and the grooves delineated between the projections of the female member, so that the two are held in a prescribed position in the axis.

PRIOR ART DOCUMENTS

Patent Documents

Patent Document 1: Japanese PCT Patent Translation Publication No. 2007-527976

DISCLOSURE OF THE INVENTION

Problems to be Solved by the Invention

The present invention has been made in consideration of the abovementioned circumstances, and provides a connector in which the operating characteristics during connection and disconnection are improved.

Means for Solving the Problems

A first aspect of the present invention provides a connector, comprising a first tube member, on which is formed a coupling-accepting part; a second tube member, on which a coupling member for coupling with said coupling-accepting part is attached to be movable to a coupled position and an uncoupled position on an end part into which said first tube member can be pushed, and on which a ring member is attached to be movable to a locked position and an unlocked position following an axial direction on an outer perimeter part; a coupling mechanism, provided on at least one of said coupling member and said coupling-accepting part, for coupling said coupling member and said coupling-accepting part in said coupled position when said first tube member and said second tube member are connected; a movement-preventing mechanism, provided on said ring member, for preventing movement of said coupling member from the coupled position to the uncoupled position when said ring member is in said locked position; and a moving mechanism, provided on at least either one of said coupling member and said ring member, for moving said coupling member toward the direction of said uncoupled position when said ring member moves from said locked position to said unlocked position.

In the abovementioned aspect, when the first tube member and the second tube member are connected, the coupling member and the coupling-accepting part in the coupled position are coupled by the coupling mechanism provided on at least one of the coupling-accepting part formed on the first tube member and the coupling member attached to be movable on the end part of the second tube member. Also, at this time, the ring member attached to be movable to the locked position and the unlocked position following the axial direction on the outer perimeter part of the second tube member is in the locked position, and the movement-preventing mechanism provided on the ring member prevents movement of the coupling member from the coupled position to the uncoupled position.

Meanwhile, in the case when releasing the connection between the first tube member and the second tube member, the ring member is moved from the locked position to the unlocked position, whereby the moving mechanism provided on at least one of the coupling member and the ring member moves the coupling member from the coupled position to the uncoupled position. Therefore, the connection between the first tube member and the second tube member can be released.

Accordingly, the first tube member and the second tube member can be attached and detached instantly without using a fixing clip taken as a separate member from the first tube member or the second tube member. Therefore, the operating characteristics during connection and disconnection of the first tube member and the second tube member can be improved.

A second aspect of the present invention may be such that, in the first aspect of the present invention, said moving mechanism is a sliding part that moves sliding when said ring member is moved toward a direction of an operation to pull apart said first tube member and said second tube member.

In the abovementioned aspect, when the ring member is moved toward the direction in which the first tube member and the second tube member are pulled apart, the sliding part provided on at least one of the coupling member and the ring member slidably moves, whereby the coupling between the coupling member and the coupling-accepting part is released. Therefore, the operation to move the ring member from the locked position to the unlocked position following the axial direction and the operation to pull apart the first tube member and the second tube member are operations in the same direction, and the operating characteristics during disconnection are further improved.

A third aspect of the present invention may be such that, in the first aspect of the present invention, said moving mechanism has an impelling mechanism for impelling said coupling member toward the direction of said uncoupled position from said coupled position, and said impelling mechanism moves said coupling member from said coupled position to said uncoupled position when said ring member is moved toward a direction of operation to pull apart said first tube member and said second tube member.

In the abovementioned aspect, when the ring member is moved toward the direction to pull apart the first tube member and the second tube member, the coupling between the coupling member and the coupling-accepting part is released by the impelling force of the impelling mechanism. Therefore, the operation to move the ring member from the locked position to the unlocked position following the axial direction and the operation to pull apart the first tube member and the second tube member are operations in the same direction, and the operating characteristics during disconnection are further improved.

A fourth aspect of the present invention may be such that, in any of the first to third aspects of the present invention, said coupling mechanism couples said coupling member and said coupling-accepting member by elastic deformation.

In the abovementioned aspect, because the coupling member and the coupling-accepting part are coupled by elastic deformation of the coupling mechanism, the coupling member and the coupling-accepting member can be coupled with a simple configuration.

A fifth aspect of the present invention may be such that, in any of the first to third aspects of the present invention, said coupling mechanism has an impelling mechanism, and couples said coupling member and said coupling-accepting member by impelling force of said impelling mechanism.

In the abovementioned aspect, because the coupling part and the coupling-accepting part are coupled by moving of the coupling mechanism by the impelling force of the impelling mechanism, the coupling member and the coupling-accepting part can be coupled assuredly.

A sixth aspect of the present invention may be such that, in any of the first to fifth aspects of the present invention, said ring member has an operating part on at least a portion of an outer perimeter part.

In the abovementioned aspect, the operation of movement of the ring member is made easy by grasping the operating part provided on at least a portion of the outer perimeter part of the ring member.

A seventh aspect of the present invention may be such that, in any of the first to sixth aspects of the present invention, a space between said first tube member and said second tube member is sealed by a seal member.

In the above mentioned aspect, because the space between the first tube member and the second tube member is sealed by the seal member, the sealing characteristics of the part of connection between the first tube member and the second tube member can be assured.

An eighth aspect of the present invention may be such that, in the seventh aspect of the present invention, said seal member is arranged between wall parts opposed following said axial direction of said first tube member and said second tube member, with an opening of a V-form groove being oriented in a diameter direction of said first tube member and said second tube member.

In the abovementioned aspect, the space between wall parts opposed following the axial direction between the first tube member and the second tube member is sealed by a seal member having a V-form groove having an opening oriented in the diameter direction of the first tube member and the second tube member. Therefore, the sealing characteristics can be assured without being affected by dimensional differences in each diameter direction of the first tube member and the second tube member. As a result, the insertion force on the first tube member and the second tube member does not become greater than necessary, and the operating characteristics during connection and disconnection of the first tube member and the second tube member are further improved.

Effects of the Invention

Because the first aspect of the present invention has the abovementioned configuration, a connector can be provided, in which the operating characteristics during connection and disconnection can be improved.

Because the second aspect of the present invention has the abovementioned configuration, the operating characteristics during disconnection can be further improved.

Because the third aspect of the present invention has the abovementioned configuration, the operating characteristics during disconnection can be further improved.

Because the fourth aspect of the present invention has the abovementioned configuration, the coupling member and the coupling-accepting part can be coupled with a simple configuration.

Because the fifth aspect of the present invention has the abovementioned configuration, the coupling member and the coupling-accepting part can be coupled assuredly.

Because the sixth aspect of the present invention has the abovementioned configuration, the operation of movement of the ring member is made easier.

Because the seventh aspect of the present invention has the abovementioned configuration, the sealing characteristics of the part of connection between the first tube member and the second tube member can be assured.

Because the eighth aspect of the present invention has the abovementioned configuration, the operating characteristics during connection and disconnection of the first tube member and the second tube member can be further improved.

BRIEF DESCRIPTION OF THE DRAWINGS

FIG. 9 is a sectional view illustrating the released state corresponding to FIG. 8.

FIG. 10 is a perspective view illustrating the main parts of the connector according to the third embodiment.

FIG. 11 is an exploded perspective view illustrating the main parts of the connector according to the third embodiment.

FIG. 12 is a sectional view along the 12-12 sectional line in FIG. 10.

BEST MODES FOR CARRYING OUT THE INVENTION (First Embodiment)

The connector according to a first embodiment of the present invention is described following FIGS. 1 to 6.

Figure 1:
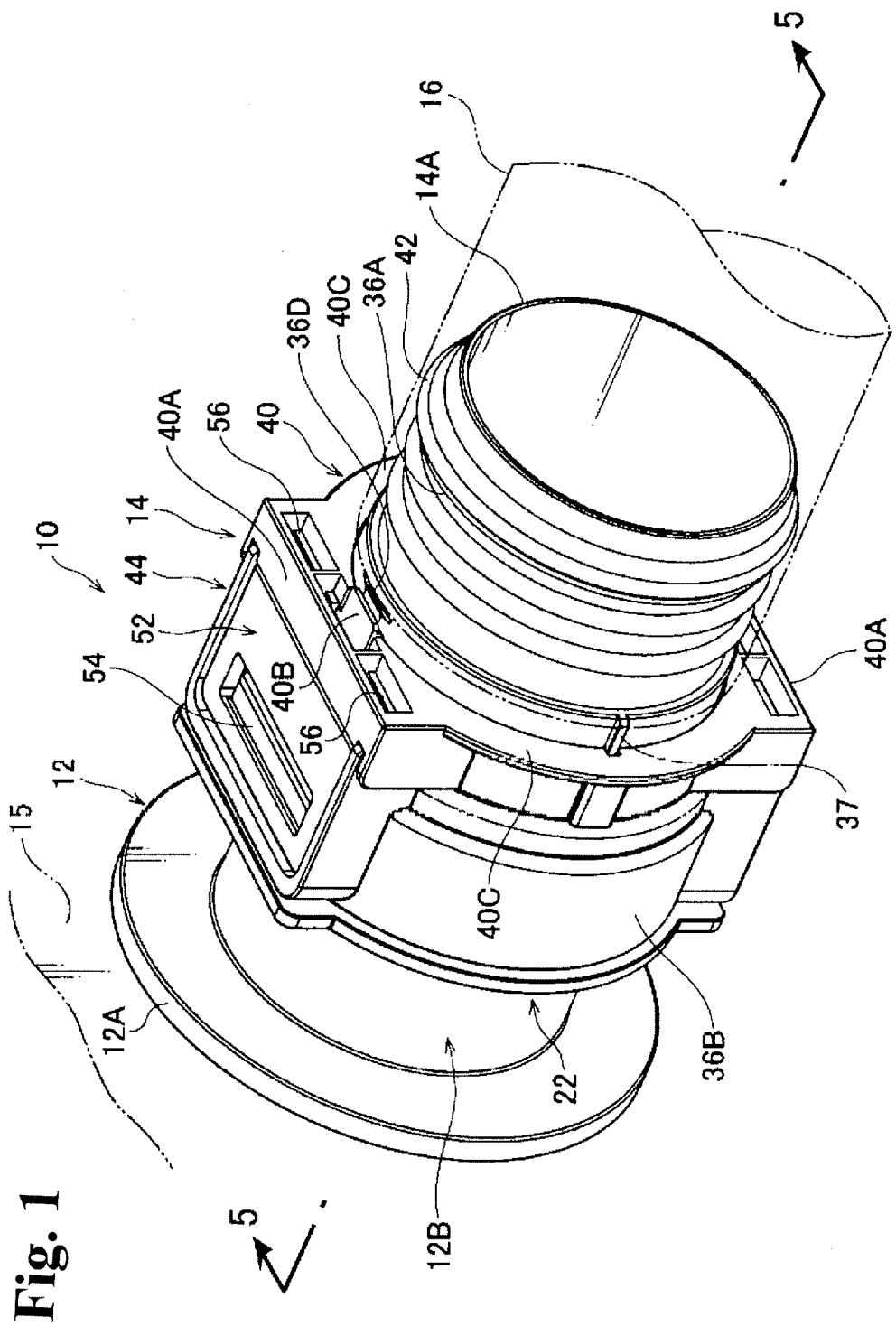
FIG. 1 is a perspective view illustrating the connector according to the first embodiment of the present invention.

As illustrated in FIG. 1, the connector 10 of the present embodiment is used, for example, as a joint connector for IN/OUT of air duct hoses of vehicles. Also, the connector 10 has a first tube member 12 and a second tube member 14. One end part 12A of the first tube member 12 is connected to a unit 15, and one end part 14A of the second tube member 14 is connected to a duct 16 connected to a ventilation apparatus for cooling.

Figure 2:
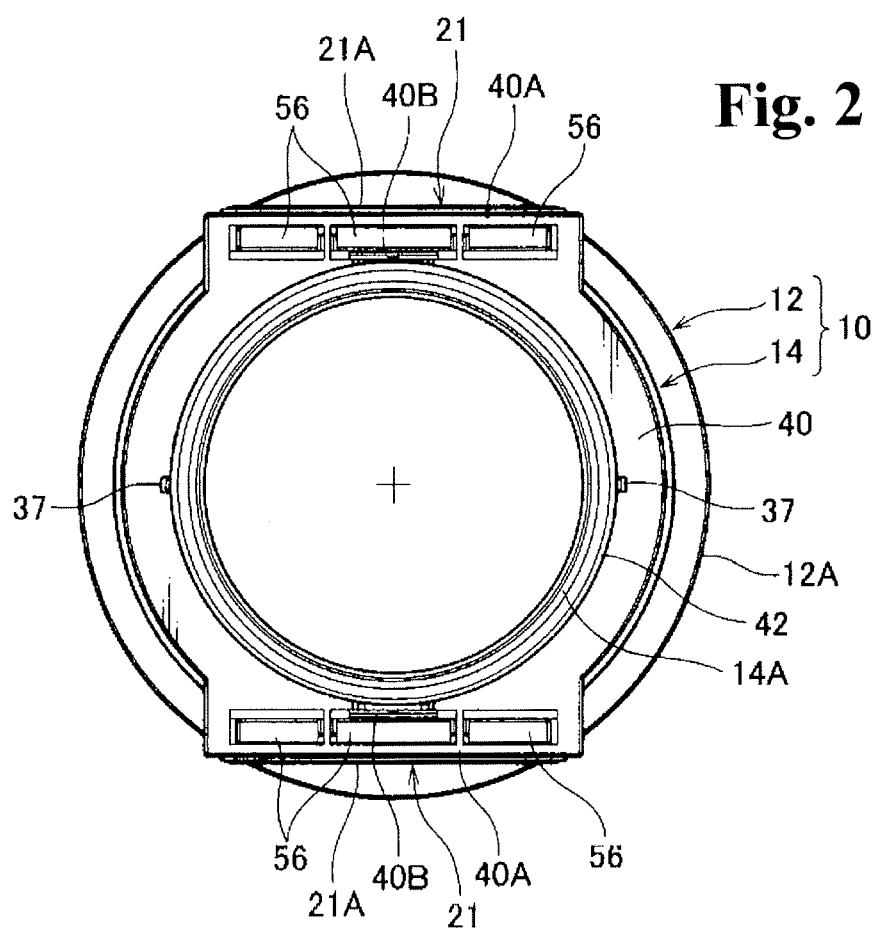
FIG. 2 is a front view illustrating the connector according to the first embodiment of the present invention viewed from the axial direction of the connector.
Figure 3:
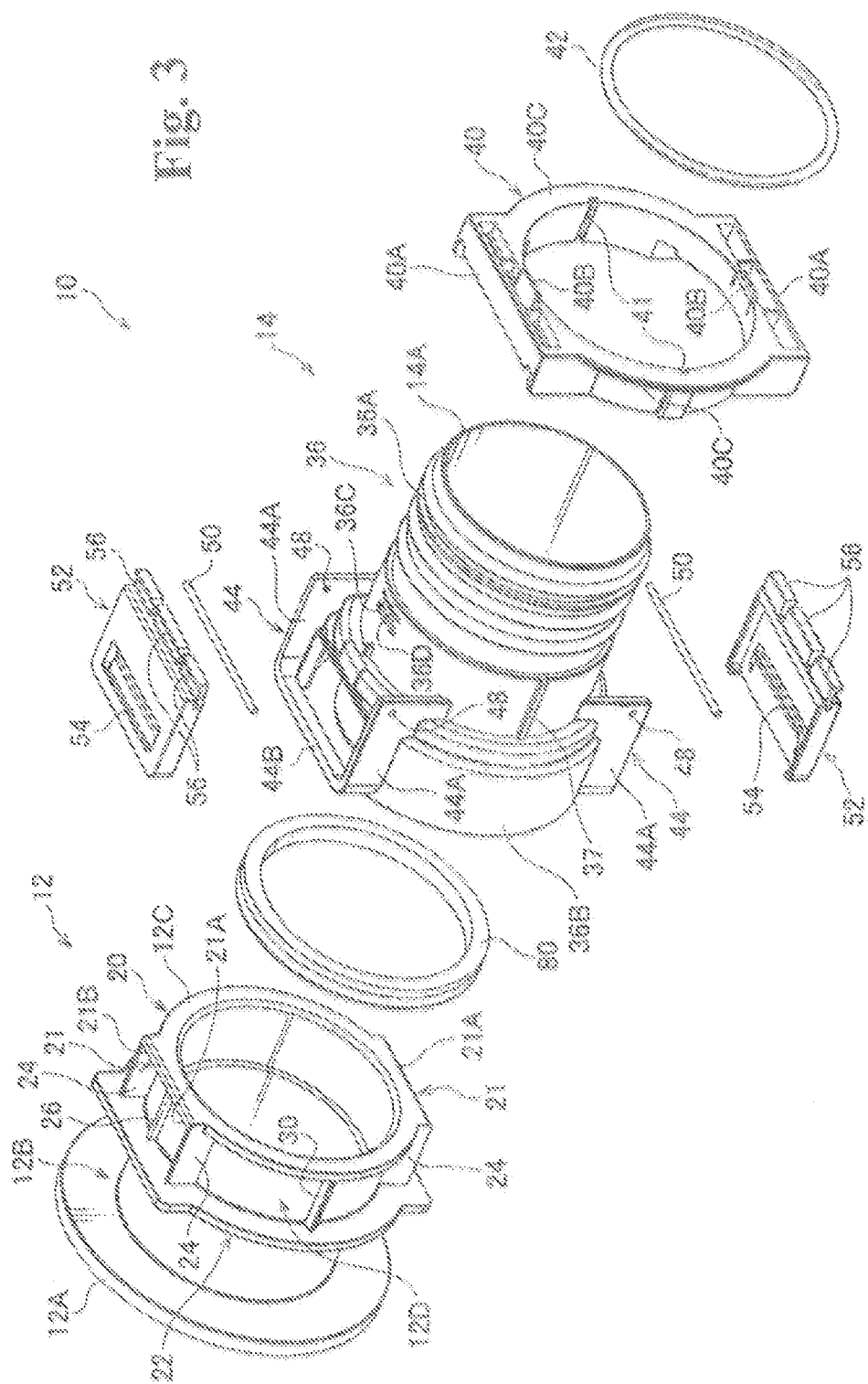
FIG. 3 is an exploded perspective view illustrating the connector according to the first embodiment of the present invention.

As illustrated in FIG. 3, the first tube member 12 has a cylindrical shape. Also, the side of the one end part 12A of the first tube member 12 is formed as a small-diameter part 12B, and the side of a connection-side end part 12C to be connected with the second tube member 14 is formed as a large-diameter part 12D. A flange 20 is formed projecting on an outer perimeter part of the connection-side end part 12C on the first tube member 12. Coupling-accepting parts 21 are formed respectively in positions spaced apart by 180° following the circumferential direction on the flange 20. As illustrated in FIG. 2, the shape of each coupling-accepting part 21 viewed from the axial direction of the first tube member 12 is such that a leading end edge part 21A has a linear shape.

Figure 6:
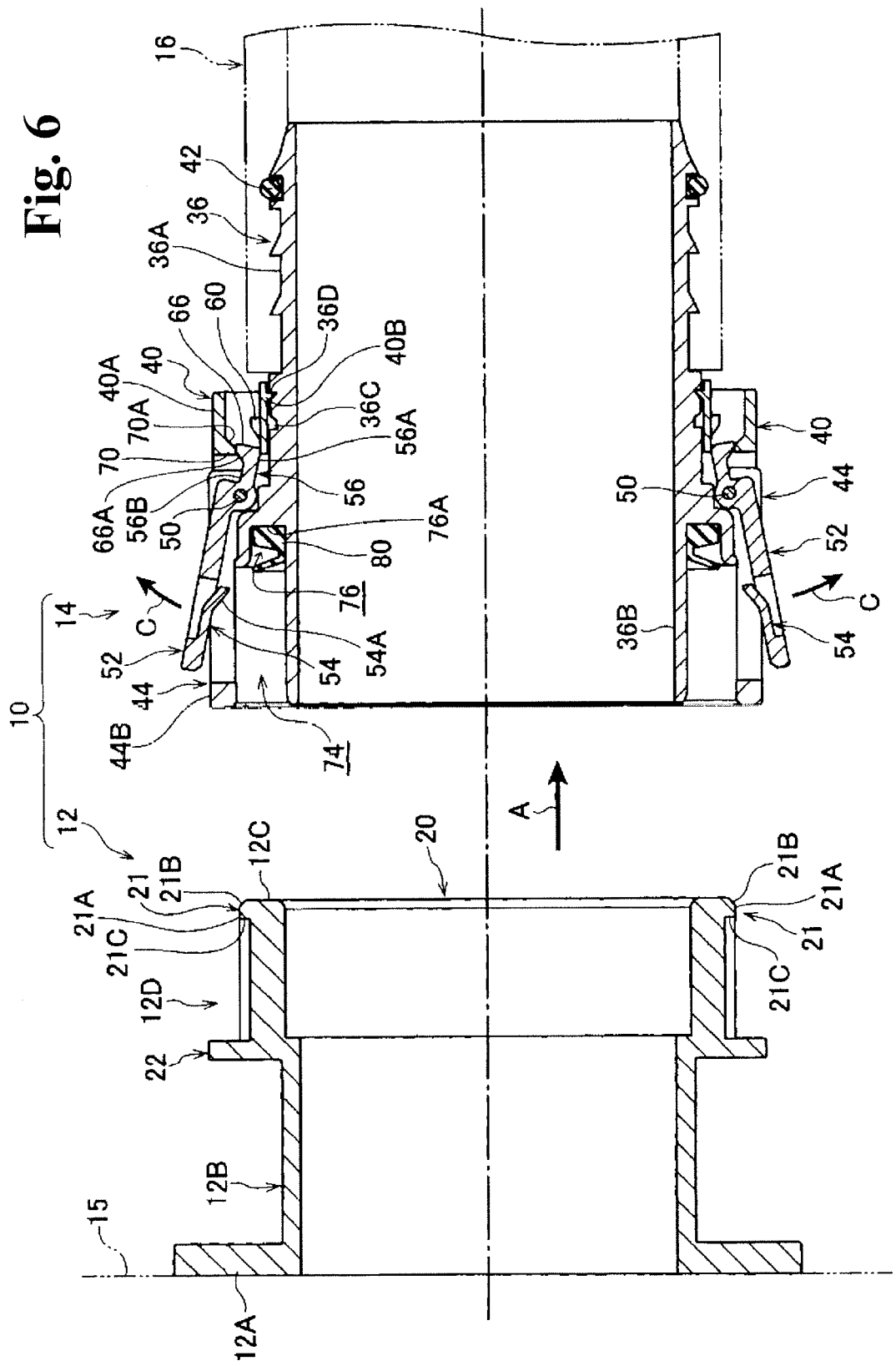
FIG. 6 is a sectional view along the 6-6 sectional line in FIG. 4.

As illustrated in FIG. 6, the sectional shape, following the axial direction of the first tube member 12 (connector 10), of an insertion-side end part 21B to be inserted into the second tube member 14 on the leading end edge part 21A of each coupling-accepting part 21 is formed as an inclined surface inclined toward a reduced-diameter direction. Also, the coupling surface 21C of each coupling-accepting part 21 is formed as a perpendicular surface.

As illustrated in FIG. 3, a flange 22 is formed projecting on an outer perimeter part serving as a boundary between the small-diameter part 12B and the large-diameter part 12D on the first tube member 12. The shape of the flange 22 viewed from the axial direction of the first tube member 12 is formed as a shape enlarging the flange 20. Also, a pair of side wall parts 24 connecting both ends of each coupling-accepting part 21 and the flange 22, and a center wall part 26 connecting the center part of each coupling-accepting part 21 and the flange 22 are formed between the flange 20 and the flange 22, extending following the axial direction of the first tube member 12.

Ribs 30 are formed projecting following the axial direction of the first tube member 12 in positions spaced apart by 90° following the circumferential direction from the center wall part 26, and both end parts in the axial direction of the rib 30 are joined to the flange 20 and the flange 22.

Meanwhile, the second tube member 14 has a cylindrically-shaped joint case 36, and a short-cylindrical (annular) ring member 40 attached to an outer perimeter part of the joint case 36. Also, a ring member 40 is provided to be movable to a locked position illustrated in FIG. 5 and an unlocked position illustrated in FIG. 6 following the axial direction of the joint case 36. That is, the ring member 40 is provided to be movable toward a direction from the locked position illustrated in FIG. 5 to the unlocked position illustrated in FIG. 6 (the direction of arrow A in FIG. 5), and toward a direction from the unlocked position illustrated in FIG. 6 to the locked position illustrated in FIG. 5 (the direction of arrow B in FIG. 5).

As illustrated in FIG. 3, guide projections 37 are formed following the axial direction of the joint case 36 respectively in positions spaced apart by 180° following the circumferential direction on the joint case 36. Meanwhile, guide grooves 41 are formed following the axial direction of the ring member 40 respectively in positions spaced apart by 180° following the circumferential direction on an inner perimeter part of the ring member 40, and guide projections 37 are inserted inside the guide grooves 41. Accordingly, the ring member 40 does not rotate in the circumferential direction of the joint case 36, but moves in the axial direction of the joint case 36.

Figure 4:
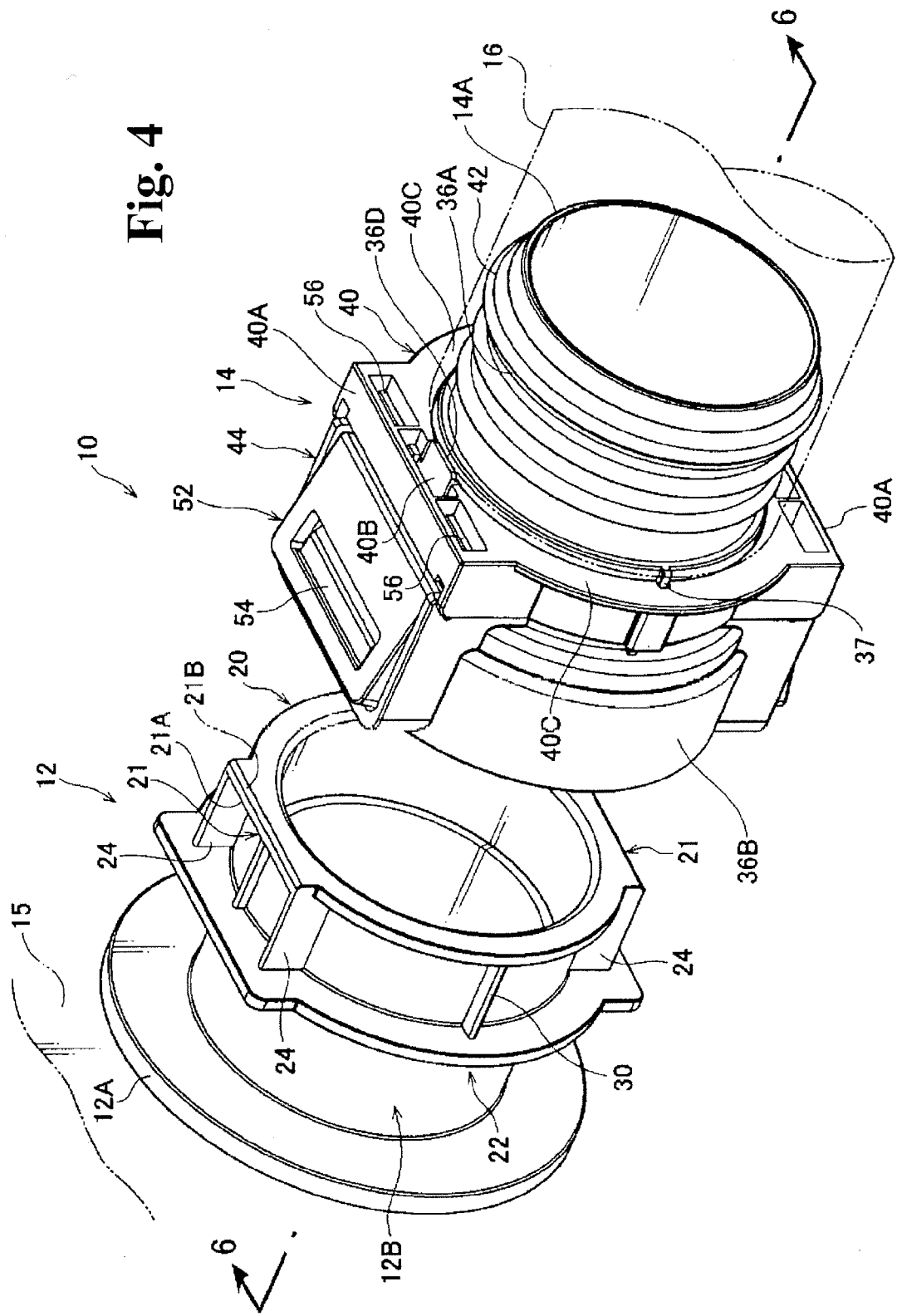
FIG. 4 is a perspective view illustrating the connector according to the first embodiment of the present invention in the state when disconnected.

As illustrated in FIG. 4, one end part of the joint case 36 serves as a connection part 36A to be connected with the duct 16, or the like, and an O-ring or other seal member 42 for sealing a space formed with an inner perimeter part of the duct 16 is provided on an outer perimeter part of the connection part 36A.

As illustrated in FIG. 3, cam insertion parts 40A are formed respectively in positions spaced apart by 90° from guide grooves 41 following the circumferential direction on the ring member 40. The shape of an outer perimeter edge part of each cam insertion part 40A viewed from the axial direction of the ring member 40 is formed as a linear shape. Also, the cam insertion part 40A has a triple-divided opening following the circumferential direction, and a positioning claw 40B is integrally formed projecting from the center part to be elastically deformable in the diameter direction. Also, as illustrated in FIG. 5, the positioning claw 40B is such that the part on the locked position side (the left side in FIG. 5) is formed as an inclined surface and the part on the unlocked position side (the right side in FIG. 5) is formed as a perpendicular surface.

As illustrated in FIG. 3, locked-position indented parts 36C and unlocked-position indented parts 36D are formed, with a prescribed spacing in the axial direction of the joint case 36, respectively in positions spaced apart by 90° from the guide projection 37 following the circumferential direction on the joint case 36.

Figure 5:
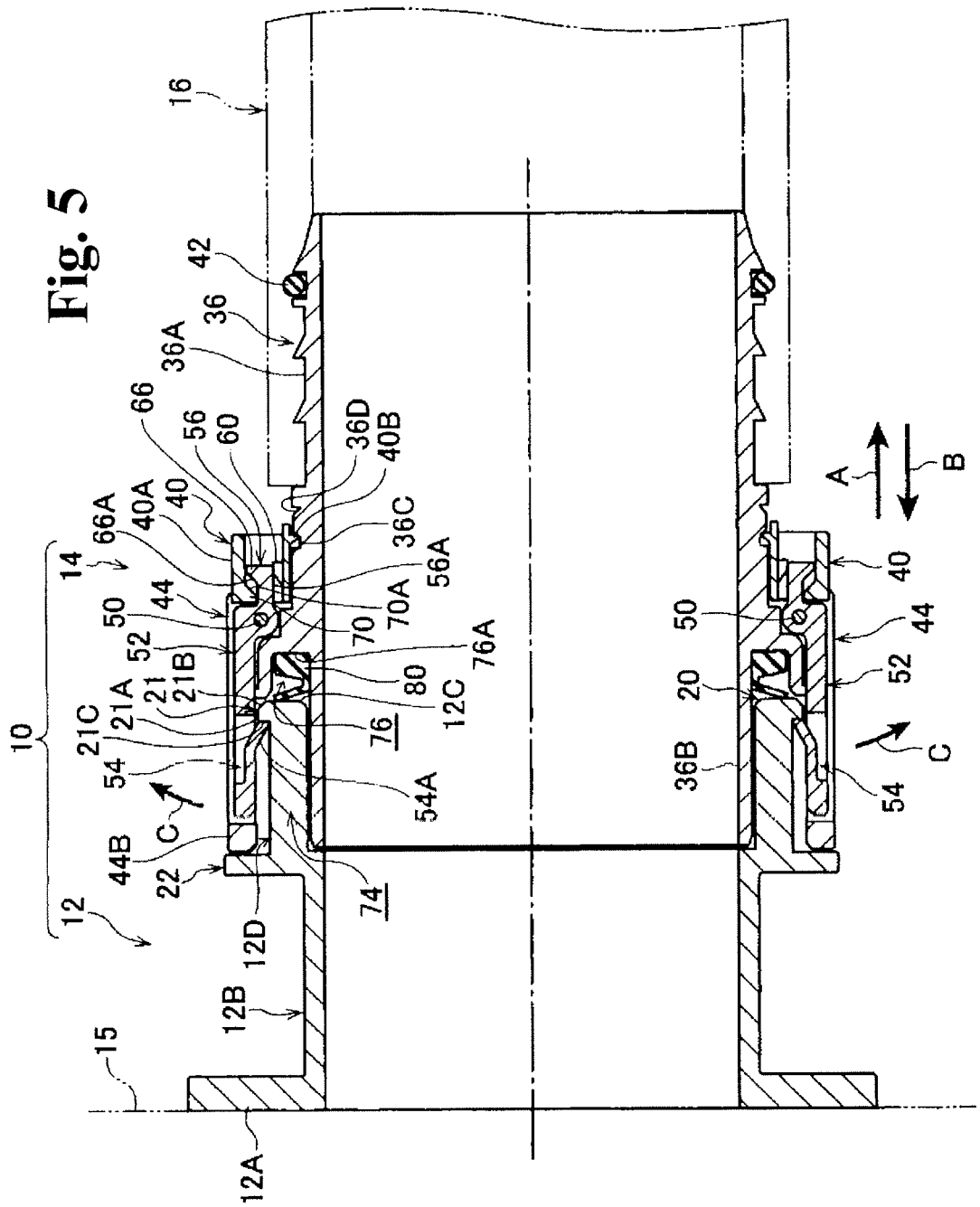
FIG. 5 is a sectional view along the 5-5 sectional line in FIG. 1.

As illustrated in FIG. 5, the locked-position indented part 36C is such that the part on the locked position side (the left side in FIG. 5) is formed as a perpendicular surface and the part on the unlocked position side (the right side in FIG. 5) is formed as an inclined surface. Also, the unlocked-position indented part 36D is such that the part on the locked position side (the left side in FIG. 5) is formed as an inclined surface and the part on the unlocked position side (the right side in FIG. 5) is formed as a perpendicular surface.

Accordingly, the ring member 40 can move easily to the locked position and the unlocked position by sliding movement between the locked-position indented part 36C and unlocked-position indented part 36D and the positioning claw 40B. Also, the ring member 40 can be held in the locked position and the unlocked position by coupling of the positioning claw 40B with the locked-position indented part 36C and the unlocked-position indented part 36D.

As illustrated in FIG. 3, a flange (operating part) 40C as an operating part is formed on the end part of the ring member 40 becoming on the side of the connection part 36A of the joint case 36, and so that an operator can easily move the ring member 40 by grasping the flange 40C. The flange 40C connects the pair of cam insertion parts 40A.

Coupling member attachment parts 44 are formed projecting on the part of the connection-side end part 36B of the joint case 36 opposite the pair of cam insertion parts 40A of the ring member 40. That is, the coupling member attachment parts 44 are formed respectively in positions spaced apart by 90° from the guide projections 37 following the circumferential direction on the joint case 36.

The shape of each coupling member attachment part 44 viewed from the diameter direction of the first tube member 12 is formed as a frame form being open on the side of the connection part 36A. Also, through-holes 48 are respectively formed on opening-side end parts of both side wall parts 44A of the coupling member attachment part 44, and shafts 50 are run through the through-holes 48.

Also, the end parts on the side opposite the opening side of both side wall parts 44A of the coupling member attachment part 44 are connected by a connection wall part 44B.

A stopper (coupling member) 52 as a coupling member is provided inside the coupling member attachment part 44. The stopper 52 is formed in a rectangular plate form, and a claw part (coupling mechanism) 54 as coupling mechanism is integrally formed on the end part of the stopper 52 on the side of the connection wall part 44B.

As illustrated in FIG. 5, the claw part 54 extends from the connection side (the left side in FIG. 5) to be connected with the first tube member 12 on the second tube member 14 toward the opposite direction (the right side in FIG. 5) following the axial direction of the second tube member 14, and a leading end part 54A is inclined in the direction toward the inside (the direction toward the axis) of the second tube member 14.

Accordingly, when the first tube member 12 is pushed into the second tube member 14 in the state in which the ring member 40 is placed in the locked position illustrated in FIG. 5, the leading end part 54A of the claw part 54 and the insertion-side end part 21B formed as an inclined surface of the coupling-accepting part 21 of the first tube member 12 move sliding, and the claw part 54 is elastically deformed, whereby the leading end part 54A of the claw part 54 rides past the coupling-accepting part 21, and couples on the inclined surface 21C of the coupling-accepting part 21.

As illustrated in FIG. 3, a cam part 56 is integrally formed on the end part of the stopper 52 on the side opposite the claw part 54. The cam part 56 is triple-divided following the circumferential direction of the joint case 36, and each divided part is respectively inserted in an opening of the triple-divided insertion part 40A.

As illustrated in FIGS. 5 and 6, the stopper 52 is axially supported by the shaft 50 to be capable of rotation on the coupling member attachment part 44. That is, the stopper 52 is capable of rotation to a coupled position, in which the claw part 54 is coupled with the coupling-accepting part 21 of the first tube member 12 as illustrated in FIG. 5, and to an uncoupled position, in which the coupling between the claw part 54 and the coupling-accepting part 21 of the first tube member 12 is released as illustrated in FIG. 6.

As illustrated in FIG. 5, in the case when the ring member 40 is in the locked position, an inner perimeter side surface 56A of the cam part 56 is in contact with a bump part (movement-preventing mechanism) 60 as a movement-preventing mechanism being provided on the inner perimeter surface side of the cam insertion part 40A. Therefore, when the ring member 40 is in the locked position, the bump part 60 contacts with the inner perimeter side surface 56A of the cam part 56, so that rotation of the ring member 40 in the direction toward the outside in the diameter direction, being the direction from the coupled position (the position in FIG. 5) to the uncoupled position (the position in FIG. 6) of the stopper 52 (the direction of arrow C in FIG. 5), is prevented.

As illustrated in FIG. 6, a bump part (moving mechanism, sliding part) 66 as a moving mechanism (sliding part) is formed on the leading end part of the outer perimeter side surface 56B of the cam part 56, and the side of the bump part 66 toward the shaft 60 is formed as an inclined surface 66A. Meanwhile, a bump part (moving mechanism, sliding part) 70 as a moving mechanism (sliding part) is formed on the inner perimeter surface outside the cam insertion part 40A on the ring member 40, and the part of the bump 70 opposite the inclined surface 66A of the bump part 66 is formed as an inclined surface 70A.

Accordingly, when the ring member 40 is moved in the direction from the locked position illustrated in FIG. 5 to the unlocked position illustrated in FIG. 6 (the direction of arrow A in FIG. 5), the inclined surface 70A of the bump part 70 of the ring member 40 and the inclined surface 66A of the bump part 66 of the cam part 56 move sliding, so that the stopper 52 rotates in the direction toward the outside in the diameter direction of the ring member 40, being the direction from the coupled position (the position in FIG. 5) to the uncoupled position (the position in FIG. 6) (the direction of arrow C in FIG. 5).

Therefore, when the ring member 40 is moved in the direction to pull the second tube member 14 out from the first tube member 12 (the direction of arrow A in FIG. 6), the stopper 52 rotates toward the outside of the diameter direction of the ring member 40 (the direction of arrow C in FIG. 6), and the connection is released. Therefore, the operation to move the ring member 40 from the locked position to the unlocked position following the axial direction and the operation to release the connection between the second member 14 and the first member 12 are operations in the same direction, and the operating characteristics during disconnection are further improved.

In the state in which the second tube member 14 and the first tube member 12 are connected as illustrated in FIG. 5, the flange 22 and the connection wall part 44B are adjacent. Also, the positions in the diameter direction of the flange 22 and the coupling member attachment part 44 are roughly coincident, and the positions in the diameter direction of the cam insertion part 40A and the stopper 52 are roughly coincident. Also, the stopper 52 is in a position barely inside in the diameter direction relative to the coupling member attachment part 44.

As illustrated in FIG. 6, a ring-form groove part 74 in which the large-diameter part 12D of the first tube member 12 is inserted is formed on the connection side end part on the second tube member 14 to be connected with the first tube member 12. A bottom part of the groove part 74 serves as a seal member holding part 76, and a V-ring (seal member) 80 as a seal member, having a V-form groove having an opening oriented toward the outside in the diameter direction of the first tube member 12 and the second tube member 14 in section following the axial direction of the second tube member 14, is installed in the seal member holding part 76. Accordingly, in the case when the second tube member 14 and the first tube member 12 are connected, as illustrated in FIG. 5, the V-ring 70 is compressed in the direction to close the V-form groove by the end part 12C on the connection side of the first tube member 12 and the bottom face 76A of the seal member holding part 76 on the second tube member 14, being the wall parts opposed following the axial direction of the first tube member 12 and the second tube member 14, whereby the gap between the second tube member 14 and the first tube member 12 is sealed. Therefore, the sealing characteristics can be assured without being affected by dimensional differences in each diameter direction of the first tube member 12 and the second tube member 14. As a result, the insertion force on the first tube member 12 and the second tube member 14 does not become greater than necessary.

(Operation and Effects)

The operation and effects of the connector according to the present embodiment are next described.

As illustrated in FIGS. 1 and 5, in the case when the first tube member 12 and the second tube member 14 of the connector 10 are connected and the ring member 40 is in the locked position, as illustrated in FIG. 5, the leading end part 54A of the claw part 54 of the stopper 52 provided on the second tube member 14 is coupled on the coupling surface 21C of the coupling-accepting part 21 of the first tube member 12. Also, the inner perimeter side surface 56A of the cam part 56 of the stopper 52 is in contact with the bump part 60 provided on the inner perimeter surface side of the cam insertion part 40A, and rotation of the stopper 52 from the coupled position (the position in FIG. 5) to the uncoupled position (the position in FIG. 6) is prevented.

At this time, the positioning claw 40B of the ring member 40 is coupled to the locked-position indented part 36C of the joint case 36, so that the ring member 40 does not easily move.

Next, in the case when releasing the connection between the first tube member 12 and the second tube member 14, the ring member 40 is moved in the direction from the locked position illustrated in FIG. 5 to the unlocked position illustrated in FIG. 6 (the direction of arrow A in FIG. 5). At this time, the operator can easily move the ring member 40 in the direction of arrow A in FIG. 5 by grasping the flange 40C of the ring member 40.

When the ring member 40 is moved in the direction of arrow A in FIG. 5, as illustrated in FIG. 6, the inclined surface 70A of the bump part 70 of the ring member 40 and the inclined surface 66A of the bump part 66 of the cam part 56 move sliding, and the stopper 52 rotates in the direction from the coupled position (the position in FIG. 5) to the uncoupled position (the position in FIG. 6) (the direction of arrow C in FIG. 6). As a result, the coupling between the leading end part 54A of the claw part 54 of the stopper 52 provided on the second tube member 14 and the coupling surface 21C of the coupling-accepting part 21 of the first tube member 12 is released.

Also, when the ring member 40 is moved to the unlocked position illustrated in FIG. 6, the positioning claw 40B of the ring member 40 couples on the unlocked-position indented part 36D of the joint case 36, and the second tube member 14 moves in the direction away from the first tube member 12 as one body with the ring member 40.

Accordingly, in the present embodiment, the operation to move the ring member 40 from the locked position to the unlocked position following the axial direction and the operation to release the connection between the second tube member 14 and the first tube member 12 are operations in the same direction. Therefore, the operating characteristics during disconnection of the first tube member 12 and the second tube member 14 are further improved.

Meanwhile, in the case when connecting the second tube member 14 and the first tube member 12, the ring member 40 is moved to the locked position illustrated in FIG. 5, and in this state, the large-diameter part 12D of the first tube member 12 is pushed into the groove part 74 of the second tube member 14. At this time, the stopper 52 of the second tube member 14 cannot rotate in the direction of arrow C because of the contact between the cam part 56 and the bump part 60. Therefore, the leading end part 54A of the claw part 54 and the insertion-side end part 21B formed as an inclined surface of the coupling-accepting part 21 of the first tube member 12 move sliding, and the claw part 54 is elastically deformed, whereby the leading end part 54A of the claw part 54 rides past the coupling-accepting part 21, and couples on the coupling surface 21C of the coupling-accepting part 21. As a result, the second tube member 14 and the first tube member 12 become in the connected state illustrated in FIG. 5. Also, because the claw part 54 of the stopper 52 couples on the coupling-accepting part 21 by elastic deformation of the claw part 54, the stopper 52 and the coupling-accepting part 21 can be coupled with a simple configuration.

Also, in the connected state of the second tube member 14 and the first tube member 12, the V-ring 80 is compressed in the direction to close the V-form groove by the end part 12C on the connection side of the first tube member 12 and the bottom face 76A of the seal member holding part 76 on the second tube member 14, and the gap between the second tube member 14 and the first tube member 12 is sealed.

Thus, in the connector 10 of the present embodiment, the first tube member 12 and the second tube member 14 can be connected and disconnected instantly without using a fixing clip taken as a separate member from the first tube member 12 or the second tube member 14. Therefore, the operating characteristics during connection and disconnection of the first tube member 12 and the second tube member 14 can be improved.

Also, in the present embodiment, the two stoppers 52 can be rotated simultaneously by operating the ring member 40. Therefore, the stoppers 52 are not removed one at a time.

Also, in the present embodiment, one-touch locking is made possible because the claw part 54 couples on the coupling-accepting part 21 by just pushing the second tube member 14 into the first tube member 12.

Also, in the present embodiment, tools, or the like, are not required during connection and disconnection of the first tube member 12 and the second tube member 14. Therefore, connection and disconnection of the first tube member 12 and the second tube member 14 is made possible even in a narrow space where a tool cannot be inserted, as long as there is sufficient space to be able to move the ring member 40 following the axial direction of the connector 10.

Also, in the present embodiment, in the case when the second tube member 14 and the first tube member 12 are connected, as illustrated in FIG. 5, the V-ring 80 is compressed in the direction to close the V-form groove by the end part 12C on the connection side of the first tube member 12 and the bottom face 76A of the seal member holding part 76 on the second tube member 14, whereby the gap between the second tube member 14 and the first tube member 12 is sealed. Therefore, sealing characteristics that are less affected by dimensional differences in each diameter direction of the first tube member 12 and the second tube member 14 can be assured, compared with the case when an O-ring is used instead of a V-ring 80. As a result, the insertion force and pulling-out force on the first tube member 12 and the second tube member 14 do not become greater than necessary, such as in the case when using an O-ring provided with a scrap value having estimated a safety value for dimensional differences. In particular, the insertion force and pulling-out force on the second tube member 14 and the first tube member 12 do not become greater than necessary in the case when the second tube member 14 and the first tube member 12 have large aperture. Therefore, the operating characteristics during connection and disconnection of the first tube member 12 and the second tube member 14 can be further improved.

Also, in the present embodiment, in the case when the connector 10 is used under water, or the like, self-sealing characteristics of the V-ring 80 are operative by pushing the first tube member 12 and the second tube member 14 together by water pressure (external pressure). Therefore, the sealing characteristics are improved when the water depth becomes deeper (when the external pressure becomes higher).

In the abovementioned first embodiment, the stopper 52 is installed on the coupling member attachment part 44 of the joint case 36 to be capable of rotation by the shaft 50, but instead of this, the configuration may be such that a shaft part is integrally formed on the stopper 52, and the shaft part is supported to be capable of rotation by a shaft-bearing part formed on the coupling member attachment part 44 of the joint case 36.

Also, in the abovementioned first embodiment, as moving mechanisms (sliding parts), the side toward the shaft 50 of the bump part 66 formed on the leading end part of the outer perimeter side surface 56B of the cam part 56 is formed as an inclined surface 66A, and the part opposite the inclined surface 66A of the bump part 66 on the bump part 70 formed on the cam insertion part 40A of the ring member 40 is formed as an inclined surface 70A, but instead of this, the configuration may be such that only one of the sliding surfaces between the bump part 66 and the bump part 70 is formed as an inclined surface. Also, the configuration may be such that curved surfaces move sliding or other moving mechanisms (sliding parts) are formed instead of inclined surfaces.

Also, in the abovementioned first embodiment, the configuration is such that the bump part 60 provided on the inner perimeter surface side of the cam insertion part 40A as the movement-preventing mechanism contacts with the inner perimeter side surface 56A of the cam part 56 in the case when the ring member 40 is in the locked position 40, but the movement-preventing mechanism is not limited to the bump part 60, and the configuration may be such that another member or other movement-preventing mechanism is provided.

Also, in the abovementioned first embodiment, the configuration is such that the leading end part 54A of the claw part 54 and the coupling-accepting part 21 couple by elastic deformation of the claw part 54, but the configuration may be such that the leading end part 54A of the claw part 54 and the coupling-accepting part 21 couple by elastic deformation of the coupling-accepting part 21. Also, the configuration may be such that the leading end part 54A of the claw part 54 and the coupling-accepting part 21 couple by elastic deformation of both the claw part 54 and the coupling-accepting part 21.

(Second Embodiment)

Figure 7:
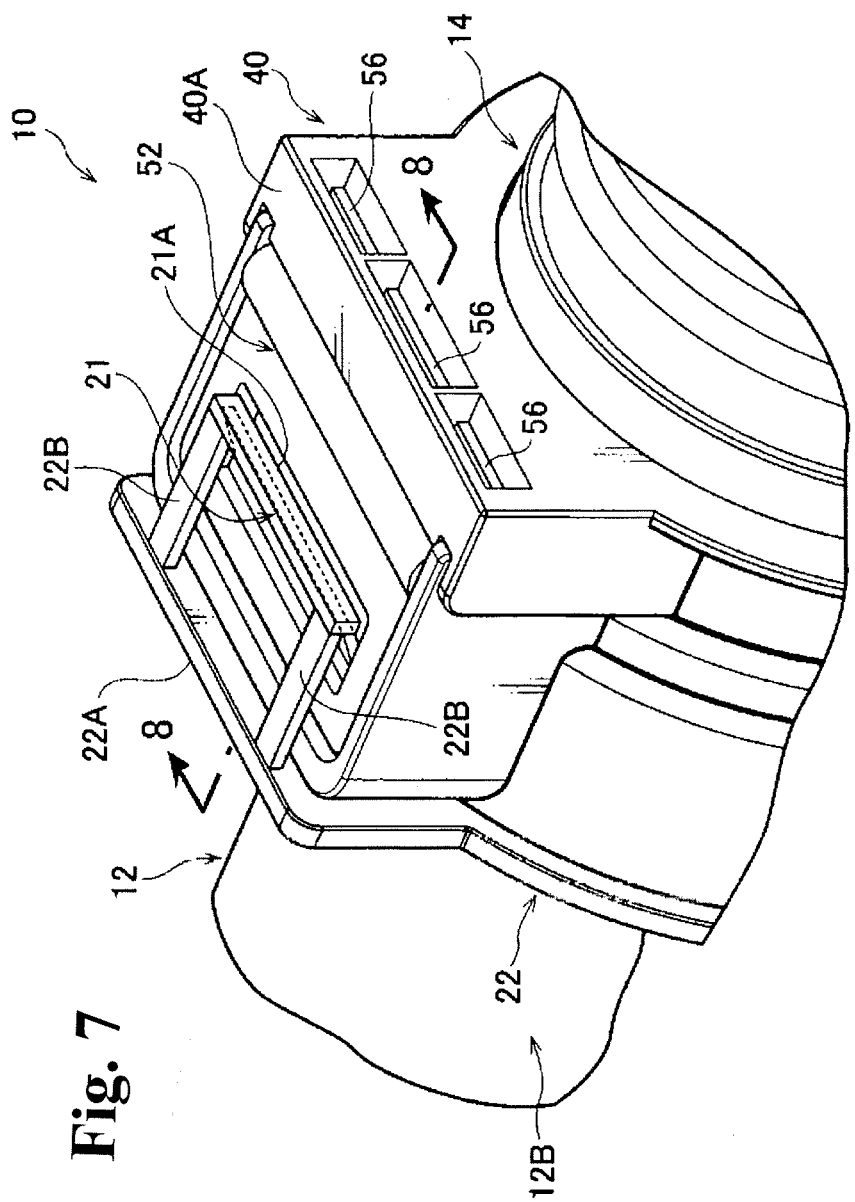
FIG. 7 is a perspective view illustrating the main parts of the connector according to the second embodiment.
Figure 8:
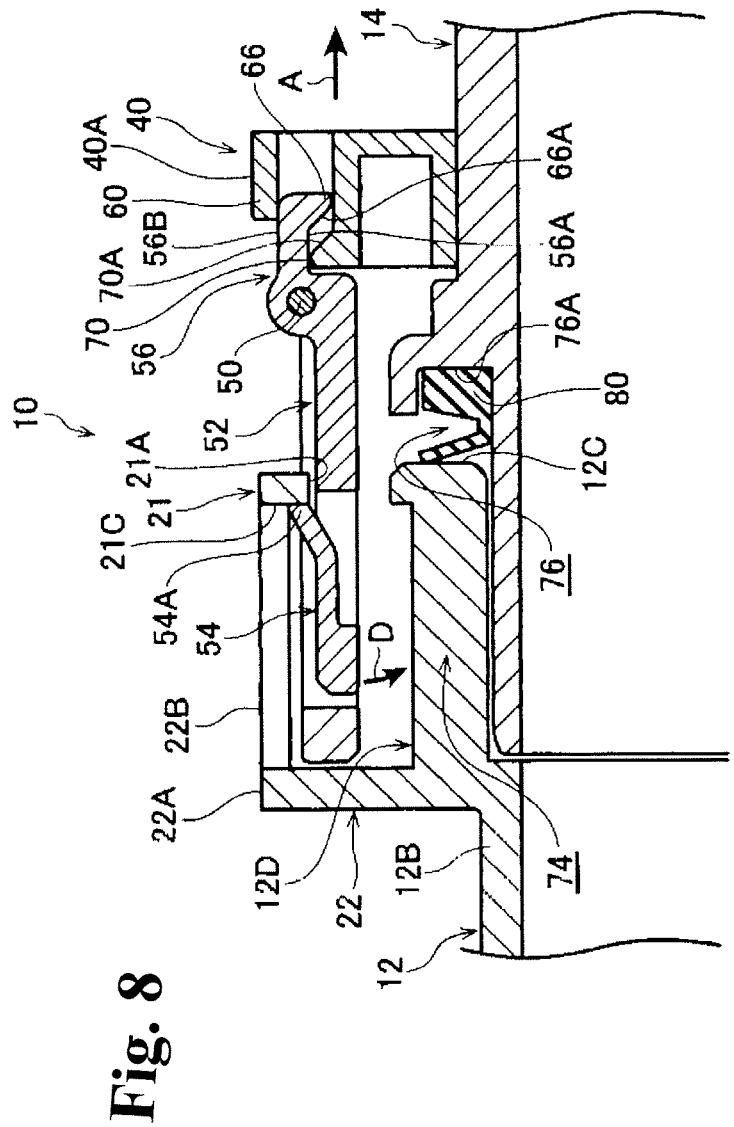
FIG. 8 is a sectional view along the 8-8 sectional line in FIG. 7.

The connector according to a second embodiment of the present invention is next described following FIGS. 7 to 9.

The same symbols are assigned to the same members as in the first embodiment, and the descriptions thereof are omitted.

As illustrated in FIG. 8, in the present working example, the direction from the coupled position (the position in FIG. 8) to the uncoupled position (the position in FIG. 9) of the stopper 52 is in the direction toward the inside in the diameter direction of the ring member 40 (the direction of arrow D in FIG. 8).

Described more specifically, as illustrated in FIG. 7, the coupling-accepting parts 21 are formed respectively in positions spaced apart by 180° following the circumferential direction of the flange 22 on the first tube member 12. The coupling-accepting parts 21 are placed across leading end parts of two arm parts 22B extending from wall parts 22A projecting to the outside in the diameter direction of the first tube member 12 from the flange 22. The shape of the coupling-accepting part 21 viewed from the axial direction of the first tube member 12 is such that a leading end edge part 21A has a linear shape.

As illustrated in FIG. 8, the claw part 54 in the present embodiment extends from the connection side (the left side in FIG. 8) to be connected with the first tube member 12 on the second tube member 14 toward the opposite direction (the right side in FIG. 8) following the axial direction of the second tube member 14, and a leading end part 54A is inclined in the direction toward the outside of the diameter direction of the second tube member 14 (the direction away from the axis).

Also, as illustrated in FIG. 8, in the case when the ring member 40 is in the locked position, an outer perimeter side surface 56B of the cam part 56 is in contact with a bump part 60 as a movement-preventing mechanism provided on the outer perimeter surface side of the cam insertion part 40A. Therefore, when the ring member 40 is in the locked position, the bump part 60 contacts with the outer perimeter side surface 56B of the cam part 56, so that rotation of the ring member 40 in the direction toward the inside in the diameter direction, being the direction from the coupled position (the position in FIG. 8) to the uncoupled position (the position in FIG. 9) of the stopper 52 (the direction of arrow D in FIG. 8), is prevented.

Accordingly, when the first tube member 12 is pushed into the second tube member 14 in the state in which the ring member 40 is placed in the locked position illustrated in FIG. 8, the leading end part 54A of the claw part 54 and the leading end part 21A of the coupling-accepting part of the first tube member 12 move sliding, and the claw part 54 is elastically deformed, whereby the leading end part 54A of the claw part 54 rides past the coupling-accepting part 21, and couples on the coupling surface 21C of the coupling-accepting part 21.

Also, in the present embodiment, a bump 66 as a moving mechanism (sliding part) is formed on a leading end part of an inner perimeter side surface 56A of the cam part 56, and the side toward the shaft 50 of the bump part 66 is formed as an inclined surface 66A. Meanwhile, a bump part 70 as a moving mechanism (sliding part) is formed on an inner perimeter surface inside the cam insertion part 40A on the ring member 40, and the part of the bump part 70 opposite the inclined surface 66A of the bump part 66 is formed as an inclined surface 70A.

Accordingly, when the ring member 40 is rotated in the direction from the locked position illustrated in FIG. 8 to the unlocked position illustrated in FIG. 9 (the direction of arrow A in FIG. 8), the inclined surface 70A of the bump part 70 of the ring member 40 and the inclined surface 66A of the bump part 66 of the cam part 56 move sliding, so that the stopper 52 rotates in the direction toward the inside in the diameter direction of the ring member 40, being the direction from the coupled position (the position in FIG. 8) to the uncoupled position (the position in FIG. 9) (the direction of arrow D in FIG. 9).

Therefore, when the ring member 40 is moved in the direction to pull the second tube member 14 out from the first tube member 12 (the direction of arrow A in FIG. 8), the stopper 52 rotates toward the inside of the diameter direction of the ring member 40 (the direction of arrow D in FIG. 8), and the connection is released. Therefore, the operation to move the ring member 40 from the locked position to the unlocked position following the axial direction and the operation to release the connection between the second tube member 14 and the first tube member 12 are operations in the same direction, and the operating characteristics during disconnection are further improved.

Accordingly, the same operation and effects as in the first embodiment are obtained also in the present embodiment.

(Third Embodiment)

The connector according to a third embodiment of the present invention is next described following FIGS. 10 to 13.

The same symbols are assigned to the same members as in the first embodiment, and the descriptions thereof are omitted.

As illustrated in FIGS. 10 and 11, in the present embodiment, the claw part 54 is formed as a separate member from the stopper 52.

Described more specifically, as illustrated in FIG. 11, the claw part 54 is provided inside an opening 53 formed on the stopper 52, and is supported to be capable of rotation centered on a shaft 55 placed across the opening 53. Also, a coil spring (impelling mechanism) 57 as an impelling mechanism is provided on an outer perimeter part of the shaft 55.

As illustrated in FIG. 10, the coil spring 57 is inserted inside a recessed part 59 formed on the claw part 54. Also, one end part 57A of the coil spring 57 is coupled to the claw part 54, and the other end part 57B of the coil spring 57 is coupled to the stopper 52.

Accordingly, as illustrated in FIG. 12, the claw part 54 is impelled by the coil spring 57 in the direction toward the inside in the diameter direction of the second tube member 14 (the direction of arrow E in FIG. 12), being the direction of coupling with the coupling-accepting part 21. An end face 54B on the side opposite a leading end part 54A of the claw part 54 contacts with an inner perimeter part 53A of the opening 53, whereby the claw part 54 stops in the coupled position illustrated in FIG. 12, and the leading end part 54A of the claw part 54 couples on the coupling surface 21C of the coupling-accepting part 21.

Figure 13:
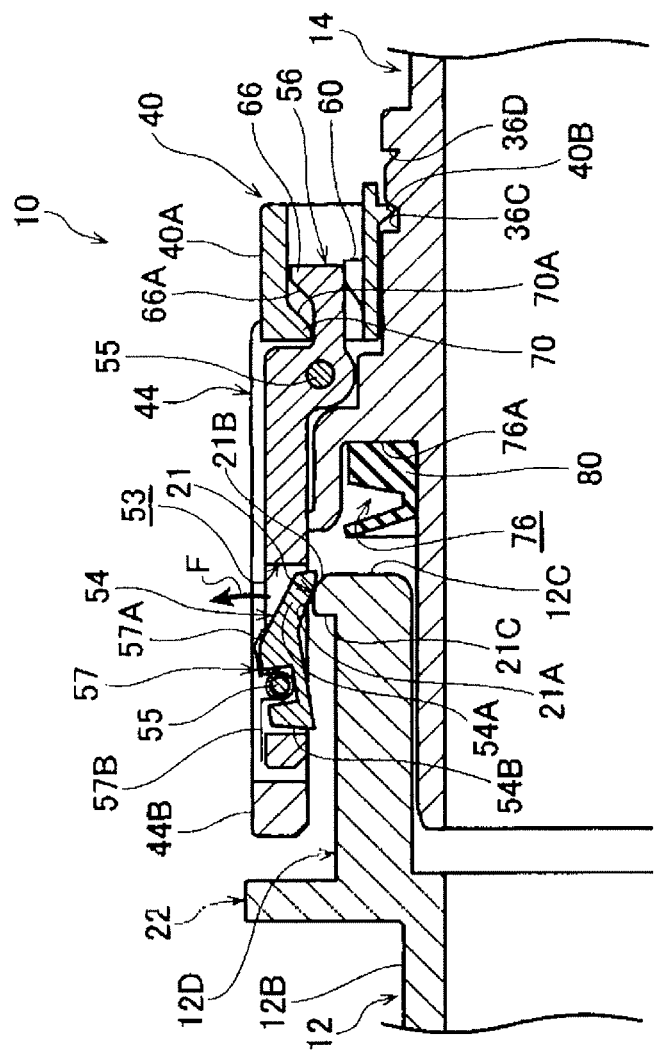
FIG. 13 is a sectional view illustrating the released state corresponding to FIG. 12.

Also, the leading end part 54A of the claw part 54 is inclined toward the inside of the diameter direction (the direction toward the axis) of the second tube member 14 toward the leading end direction. Accordingly, as illustrated in FIG. 13, when the first tube member 12 is pushed into the second tube member in the state in which the ring member 40 is placed in the locked position, the leading end part 54A of the claw part 54 and the insertion-side end part 21B formed as an inclined surface of the coupling-accepting part 21 of the first tube member 12 move sliding, and the claw part 54 rotates rotationally centered on the shaft 55, in opposition to the impelling force of the coil spring 57, in the direction toward the outside in the diameter direction of the second tube member 14 (the direction of arrow F in FIG. 13), being the direction of decoupling from the coupling-accepting part 21. Therefore, the leading end part 54A of the claw part 54 rides past the coupling-accepting part 21, and couples on the coupling surface 21C of the coupling-accepting part 21.

Accordingly, the same operation and effects as in the first embodiment are obtained also in the present embodiment. Also, in the present embodiment, because the claw part 54 of the stopper 54 and the coupling-accepting part 21 couple when the claw part 54 moves by the impelling force of the coil spring 57, the stopper 52 and the coupling-accepting part 21 can be assuredly coupled.

(Fourth Embodiment)

The connector according to a fourth embodiment of the present invention is next described following FIGS. 14 to 17.

The same symbols are assigned to the same members as in the first embodiment, and the descriptions thereof are omitted.

Figure 14:
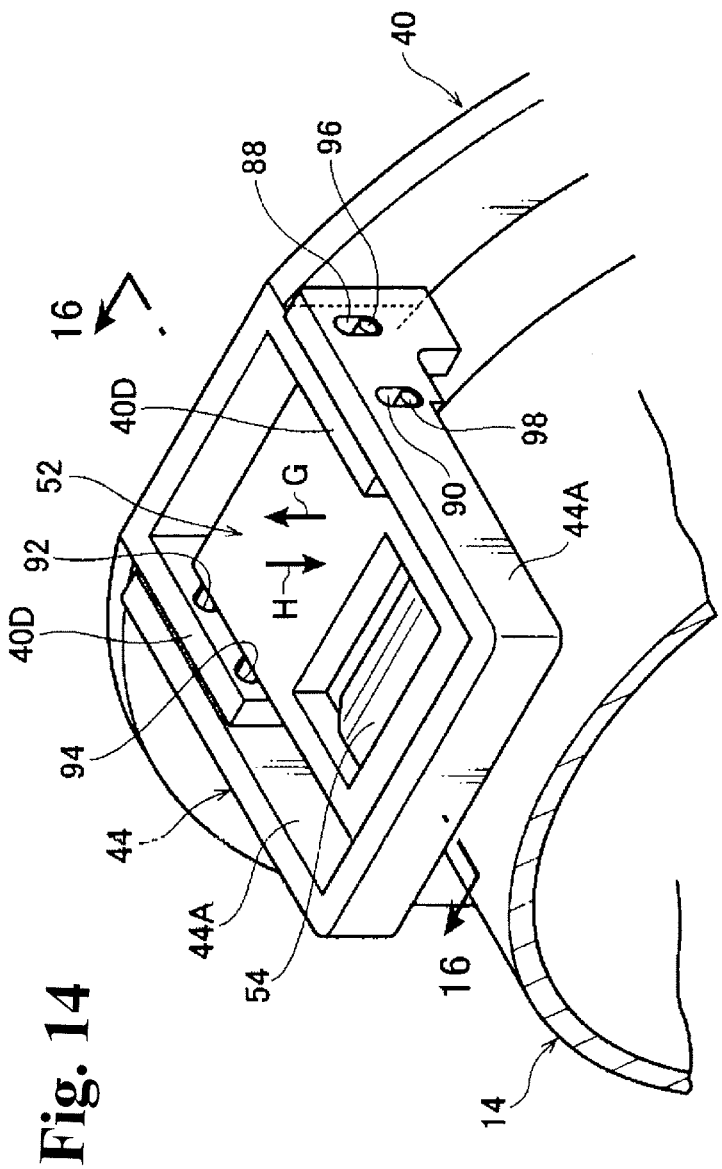
FIG. 14 is a perspective view illustrating the main parts of the connector according to the fourth embodiment.
Figure 16:
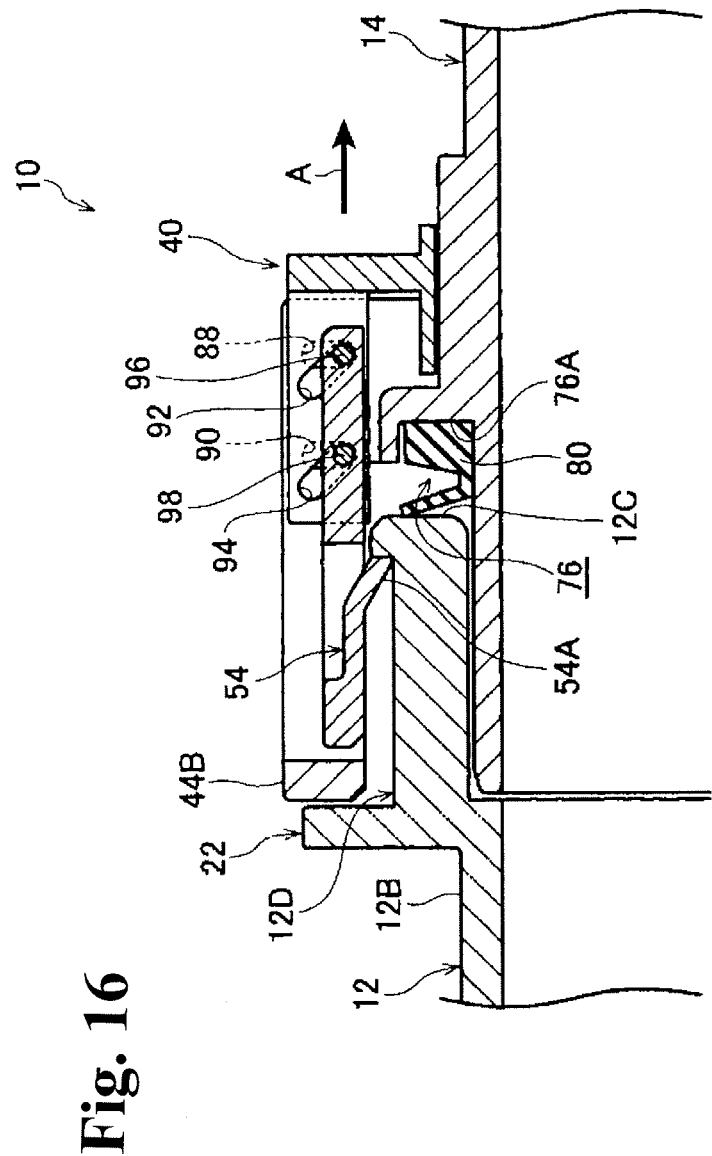
FIG. 16 is a sectional view along the 16-16 sectional line in FIG. 14.
Figure 17:
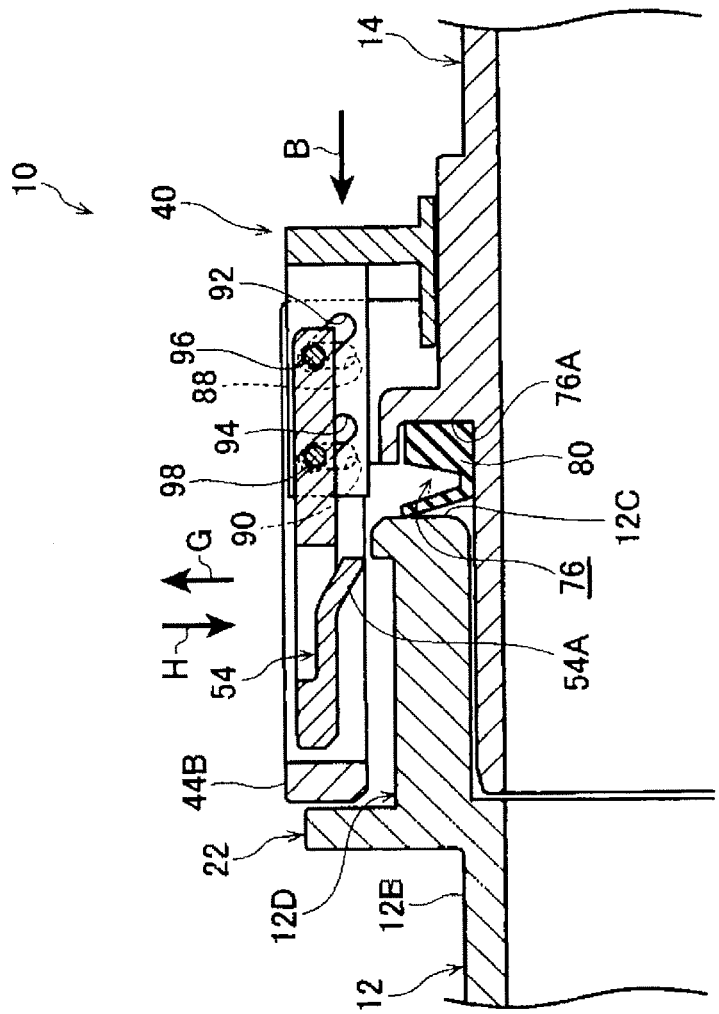
FIG. 17 is a sectional view illustrating the released state corresponding to FIG. 16.

As illustrated in FIG. 14, in the present embodiment, the stopper 52 moves in parallel in the direction toward the outside in the diameter direction ring member 40, being the direction from the coupled position (the position in FIGS. 14 and 16) to the uncoupled position (the position in FIG. 17) (the direction of arrow G in FIGS. 14 and 17).

Figure 15:
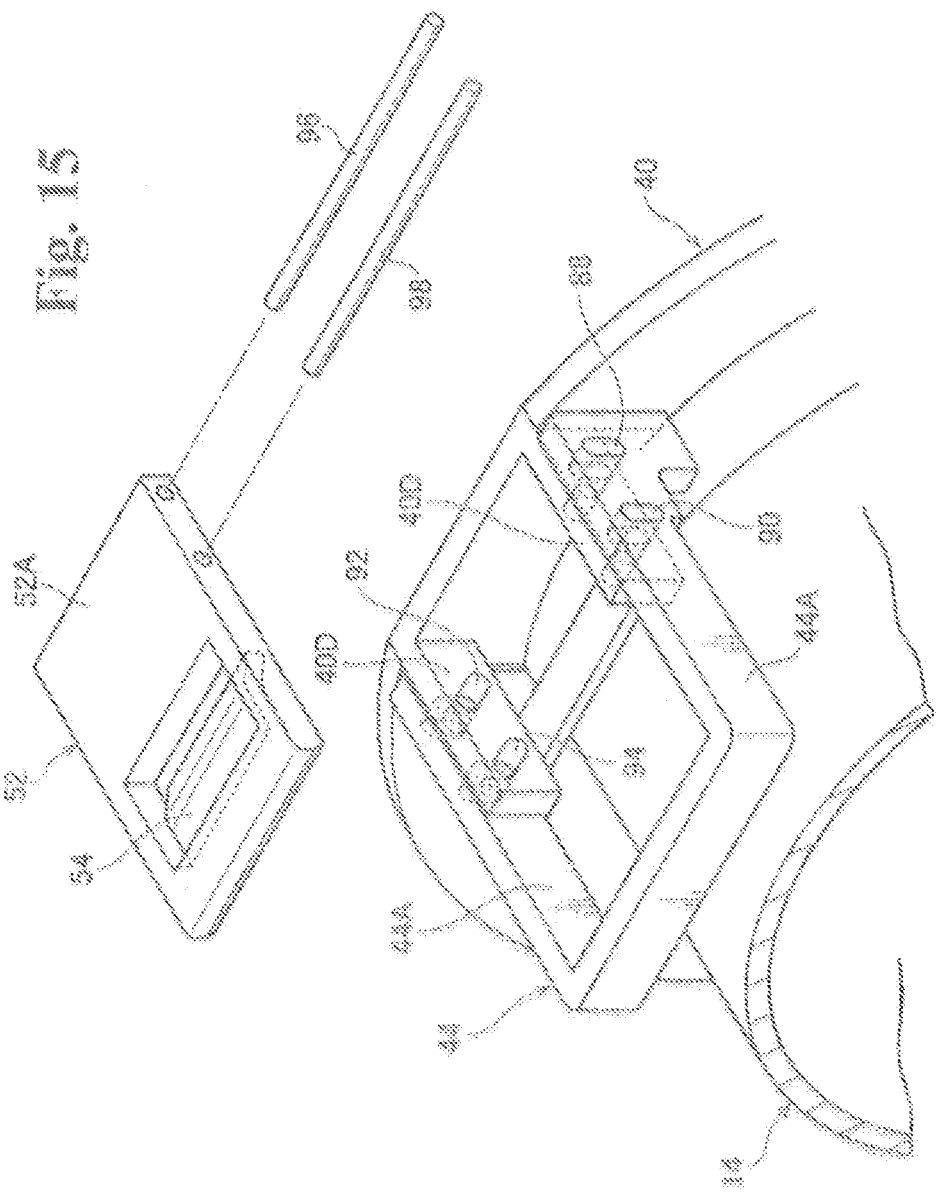
FIG. 15 is an exploded perspective view illustrating the main parts of the connector according to the fourth embodiment.

Described more specifically, as illustrated in FIG. 15, through-holes (moving mechanisms) 88 as moving mechanisms, formed on opening-side end parts of both side wall parts 44A of a coupling member attachment part 44, are formed as long holes following the diameter direction of the second tube member 14. Also, through-holes (long holes) (moving mechanisms) 90 as moving mechanisms are formed in parallel with the through-holes 88 in the vicinity of the through-holes 88 on both side wall parts 44A of the coupling member attachment part 44.

Meanwhile, a pair of shaft-bearing parts 40D is formed projecting from the ring member 40 following the inside opposite faces of both side wall parts 44A. Through-holes (moving mechanisms) 92 and 94 as moving mechanisms are formed respectively in parts corresponding to the through-holes 88 and 90 on the shaft-bearing parts 40D. Also, the through-holes 92 and 94 are inclined from the outside in the diameter direction to the inside in the diameter direction of the ring member 40 relative to the direction from the locked position illustrated in FIG. 16 to the unlocked position illustrated in FIG. 17 (the direction of arrow A in FIG. 16).

As illustrated in FIG. 15, the end part on the side opposite the claw part 54 on the stopper 52 is formed as a plate-form part 52A, and two shafts (moving mechanisms) 96 and 98 as moving mechanisms run through the plate-form part 52A with a proscribed spacing in the direction from the locked position to the unlocked position. Also, both end parts of the shafts 96 and 98 are inserted to be movable in the through-holes 92 and 94 of the shaft-bearing parts 40D of the ring member 40 and the through-holes 88 and 90 of both side wall parts 44A of the coupling member attachment part 44.

Accordingly, when the ring member 40 is moved in the direction from the locked position illustrated in FIG. 16 to the unlocked position illustrated in FIG. 17 (the direction of arrow A in FIG. 16), the through-holes 92 and 94 formed in the ring member 40 move in the direction of arrow A relative to the through-holes 88 and 90 formed in the coupling member attachment part 44. Therefore, the two shafts 96 and 98 move sliding with the through-holes 88 and 90 and with the through-holes 92 and 94, whereby the stopper 52 moves in parallel in the direction toward the outside in the diameter direction of the ring member 40, being the direction from the coupled position (the position in FIGS. 14 and 16) to the uncoupled position (the position in FIG. 17) (the direction of arrow G in FIGS. 14 and 17).

When the ring member 40 is moved in the direction from the unlocked position illustrated in FIG. 17 to the locked position illustrated in FIG. 16 (the direction of arrow B in FIG. 17), the through-holes 92 and 94 formed in the ring member 40 move in the direction of arrow B relative to the through-holes 88 and 90 formed in the coupling member attachment part 44. Therefore, the two shafts 96 and 98 move sliding with the through-holes 88 and 90 and with the through-holes 92 and 94, whereby the stopper 52 moves in parallel in the direction toward the inside in the diameter direction of the ring member 40, being the direction from the uncoupled position (the position in FIG. 17) to the coupled position (the position in FIGS. 14 and 16) (the direction of arrow H in FIGS. 14 and 17).

Meanwhile, in the case when connecting the second tube member 14 and the first tube member 12, the ring member 40 is moved to the locked position illustrated in FIG. 16, and in this state, the large-diameter part 12D of the first tube member 12 is pushed into the groove part 74 of the second tube member 14. At this time, the stopper 52 of the second tube member 14 cannot move in parallel toward the outside in the diameter direction of the ring member 40 (the direction of arrow G in FIGS. 14 and 17) because of the through-holes 92 and 94. Therefore, the leading end part 54A of the claw part 54 and the insertion-side end part 21B formed as an inclined surface of the coupling-accepting part 21 of the first tube member 12 move sliding, and the claw part 54 is elastically deformed, whereby the leading end part 54A of the claw part 54 rides past the coupling-accepting part 21, and couples on the coupling surface 21C of the coupling-accepting part. As a result, the second tube member 14 and the first tube member 12 become in the connected state illustrated in FIG. 16.

Therefore, the same operation and effects as in the first embodiment are obtained also in the present embodiment.

(Fifth Embodiment)

The connector according to a fifth embodiment of the present invention is next described following FIGS. 18 to 21.

The same symbols are assigned to the same members as in the first embodiment, and the descriptions thereof are omitted.

Figure 20:
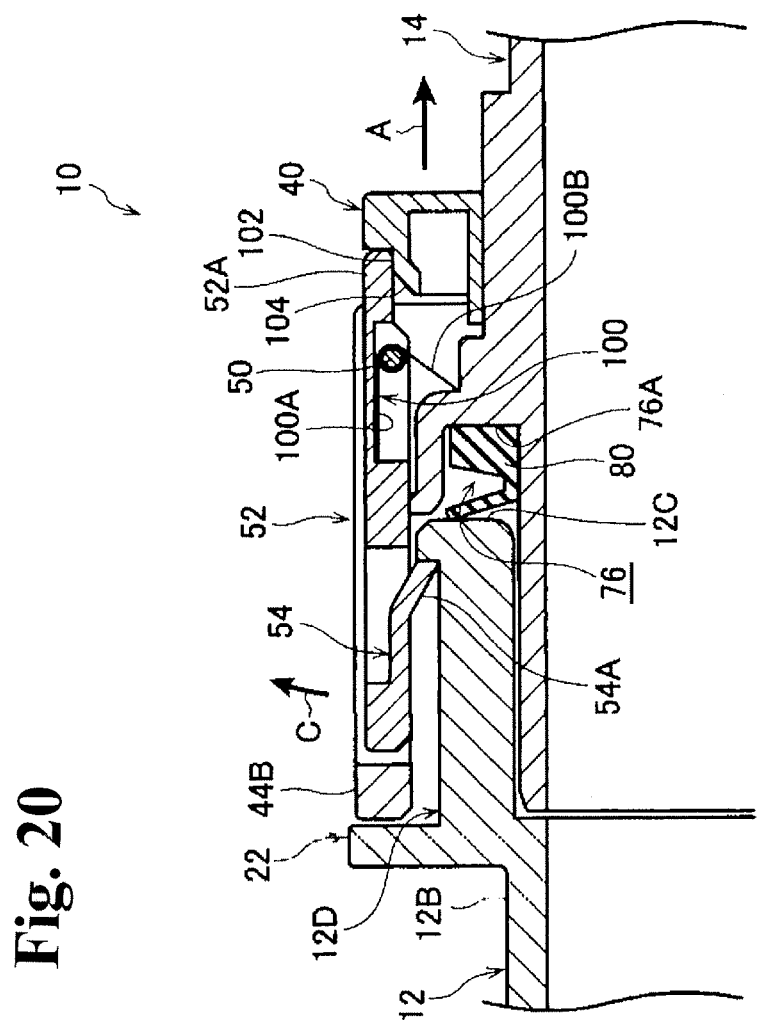
FIG. 20 is a sectional view along the 20-20 sectional line in FIG. 18.
Figure 21:
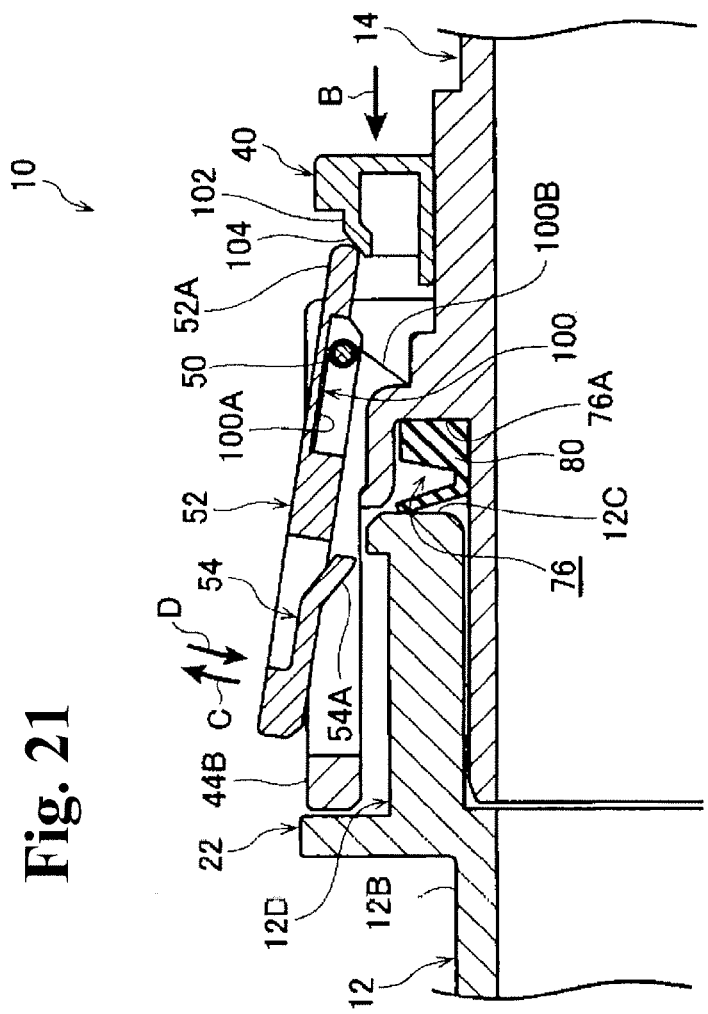
FIG. 21 is a sectional view illustrating the released state corresponding to FIG. 20.

As illustrated in FIG. 21, in the present embodiment, the stopper 52 rotates in the direction toward the outside in the diameter direction of the second tube member 14 (the direction of arrow C in FIG. 20), being the direction from the coupled position (the position in FIG. 20) to the uncoupled position (the position in FIG. 21), by the impelling force of a coil spring (moving mechanism, impelling mechanism) 100 as a moving mechanism (impelling mechanism).

Figure 18:
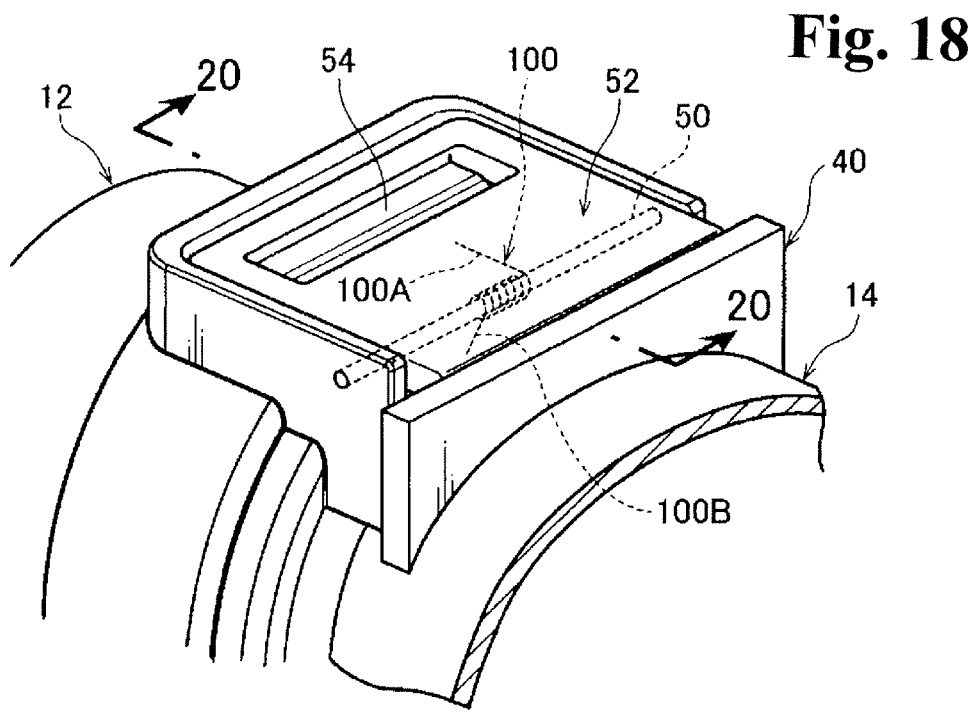
FIG. 18 is a perspective view illustrating the main parts of the connector according to the fifth embodiment.
Figure 19:
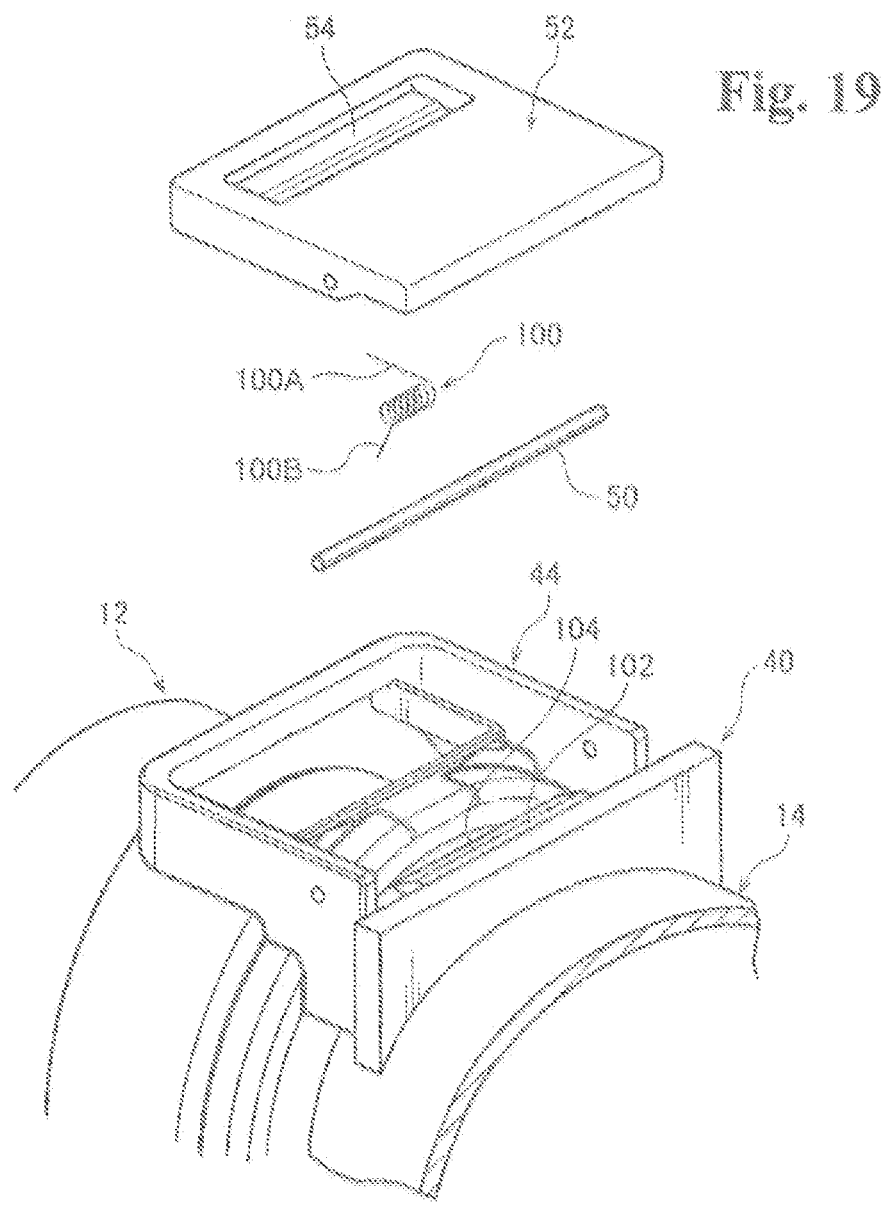
FIG. 19 is an exploded perspective view illustrating the main parts of the connector according to the fifth embodiment.

Described more specifically, as illustrated in FIGS. 18 and 19, a coil spring 100 is provided on the outer perimeter part of the shaft 50. Also, as illustrated in FIGS. 20 and 21, one end part 100A of the coil spring 100 is coupled to the stopper 52, the other end part 100B of the coil spring 100 is coupled to the second tube member 14, and the coil spring 100 impels the stopper 52 in the direction toward the outside in the diameter direction of the second tube member 14 (the direction of arrow C in FIGS. 20 and 21).

As illustrated in FIG. 20, in the case when the ring member 40 is in the locked position, the plate-form part 52A on the side opposite the claw part 54 on the stopper 52 is in contact with a step part 102 formed on the ring member 40. Therefore, when the ring member 40 is in the locked position, rotation of the stopper 52 in the direction toward the outside in the diameter direction of the ring member 40 (the direction of arrow C in FIG. 20) is prevented by the step part 102.

Also, an inclined part 104 inclined toward the inside in the diameter direction of the ring member 40 toward the leading end is formed on the leading end part of the stopper 102. Accordingly, when the ring member 40 is moved in the direction from the locked position illustrated in FIG. 20 to the unlocked position illustrated in FIG. 21 (the direction of arrow A in FIG. 20), the leading end of the plate-form part 52A of the stopper 52 contacts with the inclined part 104 of the ring member 40. Therefore, the stopper 52 rotates by the impelling force of the coil spring 100 in the direction toward the outside in the diameter direction of the ring member 40 (the direction of arrow C in FIG. 20), being the direction from the coupled position (the position in FIG. 20) to the uncoupled position (the position in FIG. 21). When the ring member 40 is moved in the direction from the unlocked position illustrated in FIG. 21 to the locked position illustrated in FIG. 20 (the direction of arrow B in FIG. 21), the leading end of the plate-form part 52A of the stopper 52 moves sliding with the inclined part 104 of the ring member 40. Therefore, the stopper 52 rotates in opposition to the impelling force of the coil spring 100 in the direction toward the inside in the diameter direction of the ring member 40 (the direction of arrow D in FIG. 21), being the direction uncoupled position (the position in FIG. 21) to the coupled position (the position in FIG. 20).

Therefore, the same operation and effects as in the first embodiment are obtained also in the present embodiment.

(Other Embodiments)

The present invention was described in detail above with respect to specific embodiments, but the present invention is not limited to the abovementioned embodiments, and it is obvious to persons skilled in the art that the all kinds of other embodiments are possible within the scope of the present invention. For example, in each of the abovementioned embodiments, stoppers 52 of the second tube member 14 and coupling-accepting parts 21 of the first tube member 12 are provided in two places spaced apart by 180° following the circumferential direction, but in the case when the connector has a large diameter, the stoppers 52 and the coupling-accepting parts 21 may be provided in three or more places, and in this case too, the stoppers 52 in three or more places are simultaneously movable by operation of the ring member 40.

Also, in each of the abovementioned working examples, a V-ring 80 as a seal member, having a V-form groove having an opening oriented toward the outside in the diameter direction of the first tube member 12 and the second tube member 14 in section following the axial direction of the second tube member 14, is installed, but instead of this, a V-ring 80 as a seal member, having a V-form groove having an opening oriented toward the inside in the diameter direction of the first tube member 12 and the second tube member 14, may be installed.

Also, the configuration may be such that A V-ring (seal member) 110 as a seal member, having a V-form groove having an opening oriented in the axial direction of the first tube member 12 to second tube member 14, is installed, as illustrated in FIGS. 22A to 22D.

Figure 22A:
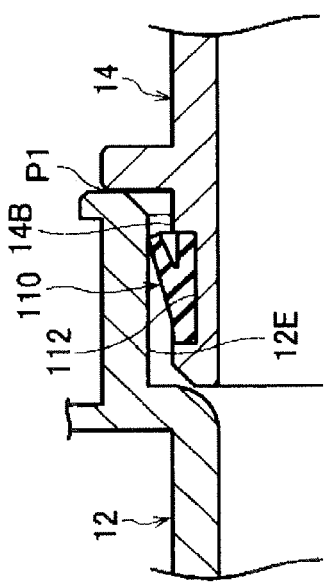
FIG. 22A is a sectional view illustrating the seal part of the connector according to another embodiment of the present invention.

For example, the configuration may be such that a V-ring 110 is arranged between a recessed part 112 provided following the outer perimeter part 14B of the second tube member 14 and the inner perimeter part 12E of the first tube member 12, with the V-form opening being oriented toward the side of an external pressure inlet part P1, and sealing is accomplished using external pressure, as illustrated in FIG. 22A.

Figure 22B:
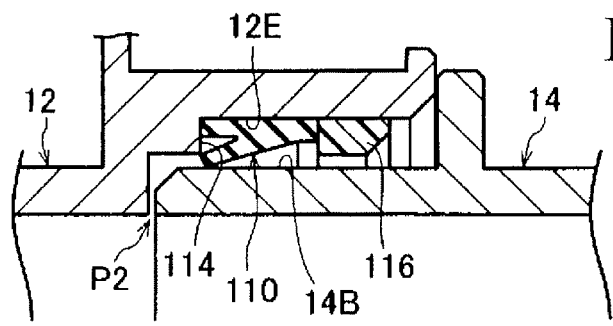
FIG. 22B is a sectional view illustrating the seal part of the connector according to another embodiment of the present invention.

Also, the configuration may be such that a V-ring 110 is held between a step part 114 provided on the inner perimeter part 12E of the first tube member 12 and a stopper 116, and is arranged between the inner perimeter part 12E of the first tube member 12 and the outer perimeter part 14B of the second tube member 14, with the V-form opening being oriented toward the side of an internal pressure inlet part P2, and sealing is accomplished using internal pressure, as illustrated in FIG. 22B.

Figure 22C:
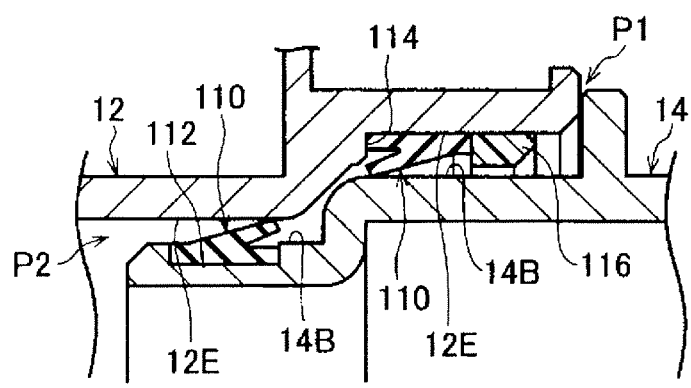
FIG. 22C is a sectional view illustrating the seal part of the connector according to another embodiment of the present invention.

Also, the configuration may be such that two V-rings 110 are used, one V-ring 110 is arranged between a recessed part 112 provided following the outer perimeter part 14B of the second tube member 14 and the inner perimeter part 12E of the first tube member 12, with the V-form opening being oriented toward the side of an external pressure inlet part P1, the other V-ring 110 is held between a step part 114 provided on the inner perimeter part 12E of the first tube member 12 and a stopper 116, and is arranged between the inner perimeter part 12E of the first tube member 12 and the outer perimeter part 14B of the second tube member 14, with the V-form opening being oriented toward the side of an internal pressure inlet part P2, and sealing is accomplished using internal pressure and external pressure, as illustrated in FIG. 22C.

Figure 22D:
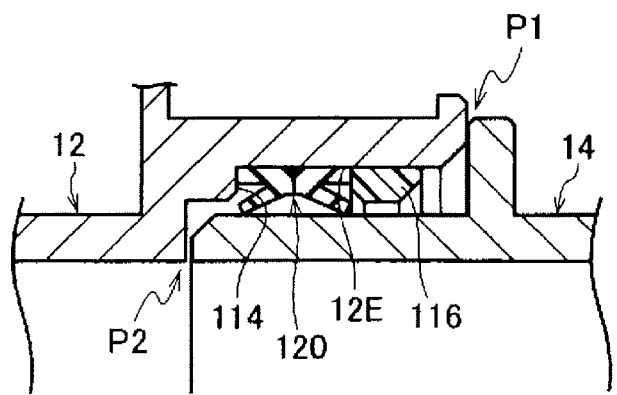
FIG. 22D is a sectional view illustrating the seal part of the connector according to another embodiment of the present invention.

Also, the configuration may he such that an X-ring (seal member) 120 having two V-form openings is held between a step part 114 provided on the inner perimeter part 12E of the first tube member 12 and a stopper 116, and is arranged between the inner perimeter part of the first tube member 12 and the outer perimeter part 14B of the second tube member 14, with one of the two V-form openings being oriented toward the side of an external pressure inlet part P1 and the other being oriented toward the side of an internal pressure inlet part P2, and sealing is accomplished using external pressure and internal pressure, as illustrated in FIG. 22D.

Also, in each of the abovementioned embodiments, a V-ring was used as the seal member, but a U-ring, O-ring, hollow ring, or other seal member may be used instead of the V-ring.

The abovementioned embodiments may be carried out suitably in combinations.

Also, in the abovementioned embodiments, the connector 10 of the present invention was applied to air duct hoses of a vehicle, but the connector 10 of the present invention is applicable also to residential piping, electrically-related connection terminals, and the like.

What is claimed is:

1. A connector, comprising:
    a first tube member having a coupling-accepting part;
    a second tube member having a connection side end part to be inserted with the first tube member;
    a coupling member attached to the connection side end part of the second tube member for coupling with said coupling-accepting part, the coupling member being capable of moving between a coupled position in which the first tube member and the second tube member are coupled, and an uncoupled position in which the first tube member and the second tube member are uncoupled;
    a ring member formed separately from the second tube member and detachably attached to the second tube member to be movable to a locked position and an unlocked position along an axial direction on an outer perimeter part of the second tube member;
    a coupling mechanism having a claw part provided on said coupling member, for coupling said coupling member and said coupling-accepting part in said coupled position when said first tube member and said second tube member are connected;
    a movement-preventing mechanism having a first bump part provided on said ring member, for preventing movement of said coupling member from the coupled position to the uncoupled position when said ring member is in said locked position; and
    a moving mechanism having a second bump part provided on said coupling member and a third bump part provided on said ring member, for moving said coupling member toward a direction of said uncoupled position when said ring member moves from said locked position to said unlocked position, wherein the third bump part protrudes toward the first bump part and formed to slide along the second bump part, so that when the ring member moves from the locked position to the unlocked position, the third bump part slides over the second bump part to unlock the ring member from the coupling member.

2. The connector according to claim 1. wherein said moving mechanism includes a sliding part sliding when said ring member is moved to an operation direction to pull apart said first tube member and said second tube member.

3. The connector according to claim 1, wherein said coupling mechanism couples said coupling member and said coupling-accepting member by elastic deformation.

4. The connector according to claim 1, wherein said ring member has an operating part on at least a portion of an outer perimeter part thereof.

5. The connector according to claim 1, wherein a space between said first tube member and said second tube member is sealed by a seal member.

6. The connector according to claim 5, wherein said seal member is arranged between wall parts opposed along said axial direction of said first tube member and said second tube member, with an opening of a V-form groove thereof being oriented in a diameter direction of said first tube member and said second tube member.

7. The connector according to claim 1, wherein the coupling member is arranged so that when the ring member is in the locked position, the coupling member is in the coupled position in which the first bump part urges the coupling member to prevent a movement of the coupling member, and when the ring member is in the unlocked position, the coupling member is in the uncoupled position in which the coupling member is movable, and the first tube member and the second tube member are uncoupled.

8. The connector according to claim 7, wherein the coupling member is integrally formed with a cam part having the second bump part,
    the ring member comprises a cam insertion part having an opening to insert the cam part of the coupling member, so that when the ring member moves from the unlocked position to the locked position, the cam part of the coupling member is inserted through the opening of the ring member and slides over the first bump part, and the first bump part urges the cam part in a direction toward the third bump part to lock the ring member.

9. The connector according to claim 8, further comprising a coupling member attachment part formed on the second tube member for attaching the coupling member to the second tube member, and a shaft arranged between the coupling member and the coupling member attachment part to rotatably support the coupling member on the coupling member attachment part, so that when the ring member moves from the unlocked position to the locked position, the coupling member rotates to the coupled position, and when the first tube member is inserted into the second tube member, the claw part couples to the coupling-accepting part.

10. The connector according to claim 9, wherein the coupling-accepting part comprises a first flange to couple with the claw part, so that when the first tube member is coupled to the second tube member, the first flange of the first tube member is inserted into the second tube member to couple with the claw part of the coupling member.

* * * * *